(12) United States Patent
Onodera et al.

(10) Patent No.: US 8,077,782 B2
(45) Date of Patent: Dec. 13, 2011

(54) ADAPTIVE MODULATION CONTROL APPARATUS AND WIRELESS COMMUNICATION APPARATUS

(75) Inventors: Takashi Onodera, Yotsukaido (JP); Toshizo Nogami, Chiba (JP); Hidekazu Tsuboi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1190 days.

(21) Appl. No.: 11/794,888

(22) PCT Filed: Jan. 5, 2006

(86) PCT No.: PCT/JP2006/300039
§ 371 (c)(1),
(2), (4) Date: Jul. 9, 2007

(87) PCT Pub. No.: WO2006/075547
PCT Pub. Date: Jul. 20, 2006

(65) Prior Publication Data
US 2009/0274199 A1    Nov. 5, 2009

(30) Foreign Application Priority Data

Jan. 11, 2005  (JP) ................................ 2005-004012
Mar. 18, 2005  (JP) ................................ 2005-078317

(51) Int. Cl.
H04K 1/10    (2006.01)
H04L 27/28    (2006.01)

(52) U.S. Cl. ........................................ 375/260; 375/259

(58) Field of Classification Search ................... 375/260
See application file for complete search history.

(56) References Cited

U.S. PATENT DOCUMENTS 5,414,766 A * 5/1995 Cannalire et al. ........ 379/406.08
(Continued)

FOREIGN PATENT DOCUMENTS

JP    10-215235 A    8/1998
(Continued)

OTHER PUBLICATIONS

Suzuki et al., "An estimation scheme of propagation path characteristics for an adaptive modulation system," Technical Report of the IEICE, The Institute of Electronics, Information and Communication Engineers, pp. 37-42.

(Continued)

*Primary Examiner* — David C. Payne
*Assistant Examiner* — Erin File
(74) *Attorney, Agent, or Firm* — Birch, Stewart, Kolasch & Birch, LLP

(57) ABSTRACT

[Object] To prevent communication performance capabilities from deteriorating even in the cases that the estimation error of the propagation path is significant, and that the variation speed of the propagation path characteristics is fast.

[Overcoming Means] An adaptive modulation control apparatus which adaptively selects a modulation parameter from among a plurality of modulation parameters corresponding to an estimation result of a propagation path state and which has a frequency axis gradient calculating section (11) which receives propagation path estimation information indicative of an estimation result of a propagation path state, and calculates a gradient of a function of frequency corresponding to each frequency when the propagation path estimation information is set to be the function of frequency, a correcting section (12) that makes a correction to increase or decrease an upper limit or a lower limit of a numerical range of the propagation path state in one-to-one correspondence with each of the modulation parameters corresponding to the calculated gradient of the function of frequency, and a modulation parameter selecting section (13) that selects a modulation parameter corresponding to the corrected numerical range of the propagation path state including the propagation path estimation information.

40 Claims, 27 Drawing Sheets

U.S. PATENT DOCUMENTS

| | | | |
|---|---|---|---|
| 6,198,781 B1 | 3/2001 | Ohno et al. | |
| 6,580,764 B1 | 6/2003 | Mochizuki | |
| 6,636,727 B2 * | 10/2003 | Muschallik et al. | 455/260 |
| 6,954,421 B2 | 10/2005 | Kuwabara et al. | |
| 7,324,795 B2 * | 1/2008 | Kuiri | 455/260 |
| 2001/0015954 A1 | 8/2001 | Kuwabara et al. | |
| 2002/0003843 A1 * | 1/2002 | Martone | 375/262 |
| 2002/0110138 A1 * | 8/2002 | Schramm | 370/430 |
| 2003/0232601 A1 | 12/2003 | Uno | |
| 2005/0123138 A1 * | 6/2005 | Abe et al. | 380/255 |
| 2006/0018458 A1 * | 1/2006 | McCree et al. | 379/406.01 |
| 2006/0018460 A1 * | 1/2006 | McCree | 379/406.08 |
| 2006/0153309 A1 * | 7/2006 | Tang et al. | 375/260 |
| 2006/0209937 A1 * | 9/2006 | Tanaka et al. | 375/219 |
| 2008/0043871 A1 * | 2/2008 | Latouche et al. | 375/261 |
| 2008/0088503 A1 * | 4/2008 | Beasley | 342/200 |
| 2008/0212727 A1 * | 9/2008 | Jahan et al. | 375/350 |

FOREIGN PATENT DOCUMENTS

| | | |
|---|---|---|
| JP | 2000-138617 | 5/2000 |
| JP | 2000-295195 A | 10/2000 |
| JP | 2001-177497 A | 6/2001 |
| JP | 2001-237798 A | 8/2001 |
| JP | 2003-333013 A | 11/2003 |
| JP | 2004-364124 A | 12/2004 |

OTHER PUBLICATIONS

Yoshiki et al., "Performance of the OFDM based on Adaptive Modulation System with a Multilevel Transmit Power Control Scheme using Delay Profile Extrapolation Technique for High Mobility Terminals," Technical Report of the IEICE, The Institute of Electronics, Information and Communication Engineers, pp. 41-46.

* cited by examiner

US 8,077,782 B2

ADAPTIVE MODULATION CONTROL APPARATUS AND WIRELESS COMMUNICATION APPARATUS

TECHNICAL FIELD

The present invention relates to an adaptive modulation control apparatus and radio communication apparatus for adaptively selecting a modulation parameter from among a plurality of modulation parameters determined based on a plurality of modulation schemes, coding rates in error correction, or combinations thereof, corresponding to an estimation result of a propagation path state.

BACKGROUND ART

In conventionally known adaptive modulation communication, a state of a propagation path is estimated to use as a criterion in adaptively selecting modulation parameters (MCS: Modulation and Coding Scheme) comprised of a plurality of modulation schemes, coding rates in error correction, or combinations thereof.

Generally, the state of the propagation path is estimated as a value such as Carrier to Noise Ratio (CNR) from a reception state in a receiver, using a preamble which is a known signal and inserted in a radio frame in a transmitter (Non-patent Document 1). Further, in sub-carrier adaptive modulation communication in a multicarrier transmission scheme, the propagation path state is estimated for each subcarrier, and a modulation parameter is selected for each subcarrier.

FIG. 24 is a diagram showing an apparatus configuration example of a transmitter in a conventional Orthogonal Frequency Division Multiplexing (OFDM) subcarrier adaptive modulation system. A propagation path estimating circuit 91 receives information such as, for example, CNR, delay profile or the like of a reception signal transmitted as feedback from a receiver, estimates the propagation path state from the information of the reception signal, and outputs the estimation result to a modulation parameter selecting circuit 92. The modulation parameter selecting circuit (uniquely) selects a modulation parameter from the input estimation result of the propagation path state, and outputs information of the selected modulation parameter to a subcarrier adaptive modulation and coding circuit 93.

The subcarrier adaptive modulation and coding circuit 93 receives transmission data, and performs adaptive modulation on the transmission data for each subcarrier corresponding to the selected modulation parameter. An IFFT circuit 94 performs inverse Fourier transform on an output of the subcarrier adaptive modulation and coding circuit 93 to transform into a digital OFDM signal, and outputs the signal to a D/A conversion circuit 95. The D/A conversion circuit 95 coverts the digital OFDM signal into an analog signal.

Further, as another conventionally known adaptive modulation communication, there is a scheme for predicting a state of a propagation path using time extrapolation of the propagation path, and based on the predicted state of the propagation path, adaptively selecting a modulation scheme (Non-patent Document 2). This time extrapolation of the propagation path is one of methods for predicting a propagation path state at the time a next communication is performed, from a past estimation value of the propagation path state and a latest estimation value of the propagation path state. FIG. 25 is a graph showing an example of time extrapolation of the propagation path state by linear approximation. A prediction value (propagation path time extrapolation value) $p_{n+1}$ of the propagation path state at time $t_{n+1}$ a communication is next performed is obtained from propagation path estimation value $p_{n-1}$ at past time $t_{n-1}$ and propagation path estimation value $p_n$ at latest time $t_n$, using Equation (1).

[Eq. 1]

$$p_{n+1} = p_n + (p_n - p_{n-1})\frac{t_{n+1} - t_n}{t_n - t_{n-1}} \quad (1)$$

FIG. 26 is a diagram showing an apparatus configuration example in a conventional OFDM subcarrier adaptive modulation system using time extrapolation of the propagation path. A propagation path estimating circuit 260 receives information such as, for example, CNR, delay profile or the like of a reception signal transmitted as feedback from a receiver, estimates the propagation path state from the information of the reception signal, and outputs the estimation result to a storage circuit 261 and time extrapolation circuit 262. The storage circuit 261 stores the input propagation path estimation result, and outputs a past propagation path estimation result to the time extrapolation circuit 262. The time extrapolation circuit 262 performs time extrapolation of the propagation path, based on the latest propagation path estimation result input from the propagation path estimating circuit 260 and the past propagation path estimation result input from the storage circuit 261, and outputs a propagation path time extrapolation value that is a prediction value of the propagation path state to a modulation parameter selecting circuit 263.

The modulation parameter selecting circuit 263 (uniquely) selects a modulation parameter from the input propagation path time extrapolation value, and outputs information of the selected modulation parameter to a subcarrier adaptive modulation and coding circuit 264. The subcarrier adaptive modulation and coding circuit 264 receives transmission data, and performs adaptive modulation on the transmission data for each subcarrier corresponding to the selected modulation parameter. An IFFT circuit 265 performs inverse Fourier transform on an output of the subcarrier adaptive modulation and coding circuit 264 to transform into a digital OFDM signal, and outputs the signal to a D/A conversion circuit 266. The D/A conversion circuit 266 coverts the digital OFDM signal into an analog signal.

Non-patent Document 1: Suzuki et al. "An Estimation Scheme of Propagation Path Characteristics for an Adaptive Modulation System" IEICE Technical Report, September, 1994, RCS94-65, p. 37-42

Non-patent Document 2: Yoshiki et al. "Performance of the OFDM based Adaptive Modulation System with a Multilevel Transmit Power Control Scheme using Delay Profile Extrapolation Technique for High Mobility Terminals", IEICE Technical Report, May, 2002, RCS2002-58, p. 41-46

DISCLOSURE OF INVENTION

Problems to be Solved by the Invention

However, it is impossible to accurately estimate a propagation path, and a propagation path estimation result includes an error. An unsuitable modulation parameter is selected by this estimation error, and problems arise that deterioration occurs in communication performance capabilities such as degradation of error rate characteristics, decreases in throughput and the like.

Further, since the actual propagation path state changes for a period during which a modulation parameter is selected based on the estimation result and the radio signal is transmitted, as a result, as in the case of the above-mentioned estimation error, an unsuitable modulation parameter is selected, and the problems arise that deterioration occurs in communication performance capabilities such as degradation of error rate characteristics, decreases in throughput and the like.

Furthermore, also in the case of performing time extrapolation of the propagation path, an error of a prediction value is large in time extrapolation by linear approximation, an unsuitable modulation parameter is elected particularly in an environment that the propagation path variation is fast and in the case where the communication interval is long, and the problems arise that deterioration occurs in communication performance capabilities such as degradation of error rate characteristics, decreases in throughput and the like.

Still furthermore, in the case of time extrapolation by polynomial approximation, the computation processing is large in the time extrapolation circuit, and problems arise such as increases in circuit scale and in power consumption.

The present invention is carried out in view of such circumstances, and it is an object of the invention to provide an adaptive modulation control apparatus and wireless communication apparatus for enabling communication performance capabilities to be prevented from deteriorating by making a correction, even in the cases that the estimation error of the propagation path is significant, and that the variation speed of the propagation path characteristics is fast.

Means for Solving the Problem (1) To achieve the above-mentioned object, the present invention takes measures as described below. Namely, an adaptive modulation control apparatus according to the invention is an adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, and characterized by comprising a frequency axis gradient calculating section which receives propagation path estimation information indicative of an estimation result of a propagation path state, and calculates a gradient of a function of frequency corresponding to each frequency when the propagation path estimation information is set to be the function of frequency, and a modulation parameter determining section that determines a modulation parameter based on the calculated gradient of the function of frequency.

Thus, by calculating a gradient of the function of frequency corresponding to each frequency when the propagation path estimation information is set to be the function of frequency, it is possible to grasp a degree of the estimation error of the propagation path and a degree of the variation speed of the propagation path characteristics. Then, since a modulation parameter is determined based on the gradient of the function of frequency, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(2) Further, in the adaptive modulation control apparatus according to the invention, the modulation parameter determining section is characterized by comprising a correcting section that makes a correction to change an upper limit or a lower limit of a numerical range of the propagation path state in one-to-one correspondence with each of the modulation parameters based on the calculated gradient of the function of frequency, and a modulation parameter selecting section that selects a modulation parameter corresponding to the corrected numerical range of the propagation path state including the propagation path estimation information.

Thus, since a correction is made to change the upper limit or the lower limit of the numerical range of the propagation path state in one-to-one correspondence with each of the modulation parameters based on the gradient of the function of frequency, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(3) Further, in the adaptive modulation control apparatus according to the invention, the modulation parameter determining section is characterized by comprising a correcting section that makes a correction to change the input propagation path estimation information based on the calculated gradient of the function of frequency, and a modulation parameter selecting section that selects a modulation parameter corresponding to the corrected propagation path estimation information.

Thus, since a correction is made to change the propagation path estimation information based on the gradient of the function of frequency, and a modulation parameter is selected corresponding to the corrected propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(4) Further, in the adaptive modulation control apparatus according to the invention, the modulation parameter determining section is characterized by comprising a correcting section that outputs a correction signal corresponding to the calculated gradient of the function of frequency, and a modulation parameter selecting section that selects a modulation parameter based on the input propagation path estimation information and the correction signal.

Thus, since a correction signal is output corresponding to the gradient of the function of frequency, and a modulation parameter is selected based on the propagation path estimation information and the correction signal, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(5) Further, an adaptive modulation control apparatus according to the invention is an adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, and characterized by comprising a storage section that stores propagation path estimation information indicative of an estimation result of a propagation path state, a time axis gradient calculating section that calculates a gradient of a function of time corresponding to each time when the propagation path estimation information is set to be the function of time, and a modulation parameter determining section that selects a modulation parameter based on the calculated gradient of the function of time.

Thus, by calculating a gradient of the function of time corresponding to each time when the propagation path estimation information is set to be the function of time, it is possible to grasp a degree of the estimation error of the propagation path and a degree of the variation speed of the propagation path characteristics. Then, since a modulation parameter is determined based on the gradient of the function of time, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(6) Further, in the adaptive modulation control apparatus according to the invention, the modulation parameter determining section is characterized by comprising a correcting section that makes a correction to change an upper limit or a lower limit of a numerical range of the propagation path state in one-to-one correspondence with each of the modulation parameters based on the calculated gradient of the function of time, and a modulation parameter selecting section that selects a modulation parameter corresponding to the corrected numerical range of the propagation path state including the propagation path estimation information.

Thus, since a correction is made to change the upper limit or the lower limit of the numerical range of the propagation path state in one-to-one correspondence with each of the modulation parameters based on the gradient of the function of time, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(7) Further, in the adaptive modulation control apparatus according to the invention, the modulation parameter determining section is characterized by comprising a correcting section that makes a correction to change the input propagation path estimation information based on the calculated gradient of the function of time, and a modulation parameter selecting section that selects a modulation parameter corresponding to the corrected propagation path estimation information.

Thus, since a correction is made to change the propagation path estimation information based on the gradient of the function of time, and a modulation parameter is selected corresponding to the corrected propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(8) Further, in the adaptive modulation control apparatus according to the invention, the modulation parameter determining section is characterized by comprising a correcting section that outputs a correction signal corresponding to the calculated gradient of the function of time, and a modulation parameter selecting section that selects a modulation parameter based on the input propagation path estimation information and the correction signal.

Thus, since a correction signal is output corresponding to the gradient of the function of time, and a modulation parameter is selected based on the propagation path estimation information and the correction signal, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(9) Further, an adaptive modulation control apparatus according to the invention is an adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, and characterized by comprising a storage section that stores propagation path estimation information indicative of an estimation result of a propagation path state, a frequency axis gradient calculating section that calculates a gradient of a function of frequency corresponding to each frequency when the propagation path estimation information is set to be the function of frequency, a time axis gradient calculating section that calculates a gradient of a function of time corresponding to each time when the propagation path estimation information is set to be the function of time, and a modulation parameter determining section that determines a modulation parameter based on the calculated gradient of the function of frequency and the calculated gradient of the function of time.

Thus, by calculating a gradient of the function of frequency corresponding to each frequency when the propagation path estimation information is set to be the function of frequency, and further calculating a gradient of the function of time corresponding to each time when the propagation path estimation information is set to be the function of time, it is possible to grasp a degree of the estimation error of the propagation path and a degree of the variation speed of the propagation path characteristics. Then, since a modulation parameter is determined based on the gradient of the function of frequency and the gradient of the function of time, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(10) Further, in the adaptive modulation control apparatus according to the invention, the modulation parameter determining section is characterized by comprising a correcting section that makes a correction to change an upper limit or a lower limit of a numerical range of the propagation path state in one-to-one correspondence with each of the modulation parameters based on the calculated gradient of the function of frequency and the calculated gradient of the function of time, and a modulation parameter selecting section that selects a modulation parameter corresponding to the corrected numerical range of the propagation path state including the propagation path estimation information.

Thus, since a correction is made to change the upper limit or the lower limit of the numerical range of the propagation path state in one-to-one correspondence with each of the modulation parameters based on the gradient of the function of frequency and the gradient of the function of time, and a modulation parameter is selected corresponding to the corrected numerical range of the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(11) Further, in the adaptive modulation control apparatus according to the invention, the modulation parameter determining section is characterized by comprising a correcting section that makes a correction to change the input propagation path estimation information based on the calculated gradient of the function of frequency and the calculated gradient of the function of time, and a modulation parameter selecting section that selects a modulation parameter corresponding to the corrected propagation path estimation information.

Thus, since a correction is made to change the propagation path estimation information based on the gradient of the function of frequency and the gradient of the function of time, and a modulation parameter is selected corresponding to the corrected propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(12) Further, in the adaptive modulation control apparatus according to the invention, the modulation parameter determining section is characterized by comprising a correcting section that outputs a correction signal corresponding to the calculated gradient of the function of frequency and the calculated gradient of the function of time, and a modulation parameter selecting section that selects a modulation parameter based on the input propagation path estimation information and the correction signal.

Thus, since a correction signal is output corresponding to the gradient of the function of frequency and the gradient of the function of time, and a modulation parameter is selected based on the propagation path estimation information and the correction signal, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(13) Further, an adaptive modulation control apparatus according to the invention is an adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, and characterized by comprising a storage section that stores propagation path estimation information indicative of an estimation result of a propagation path state, a frequency axis gradient calculating section that calculates a gradient of a function of frequency corresponding to each frequency when the propagation path estimation information is set to be the function of frequency, a time extrapolation section that calculates a propagation path time extrapolation value that is a prediction value of the propagation path state at next communication time based on the propagation path estimation information and one or a plurality of pieces of past propagation path estimation information stored in the storage section, and a modulation parameter determining section that determines a modulation parameter based on the calculated gradient of the function of frequency and the propagation path time extrapolation value.

Thus, by calculating a gradient of the function of frequency corresponding to each frequency when the propagation path estimation information is set to be the function of frequency, while calculating a propagation path time extrapolation value that is a prediction value of the propagation path state at next communication time based on one or a plurality of pieces of past propagation path estimation information, it is possible to grasp a degree of the estimation error of the propagation path and a degree of the variation speed of the propagation path characteristics. Then, since a modulation parameter is determined based on the gradient of the function of frequency and the propagation path time extrapolation value, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(14) Further, in the adaptive modulation control apparatus according to the invention, the modulation parameter determining section is characterized by comprising a correcting section that makes a correction to change an upper limit or a lower limit of a numerical range of the propagation path state in one-to-one correspondence with each of the modulation parameters based on the calculated gradient of the function of frequency, and a modulation parameter selecting section that selects a modulation parameter corresponding to the corrected numerical range of the propagation path state including the propagation path time extrapolation value.

Thus, since a correction is made to change the upper limit or the lower limit of the numerical range of the propagation path state in one-to-one correspondence with each of the modulation parameters based on the gradient of the function of frequency, and a modulation parameter is selected corresponding to the corrected numerical range of the propagation path state including the propagation path time extrapolation value, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(15) Further, in the adaptive modulation control apparatus according to the invention, the modulation parameter determining section is characterized by comprising a correcting section that makes a correction to change the propagation path time extrapolation value based on the calculated gradient of the function of frequency, and a modulation parameter selecting section that selects a modulation parameter corresponding to the corrected propagation path time extrapolation value.

Thus, since a correction is made to change the propagation path time extrapolation value based on the gradient of the function of frequency, and a modulation parameter is selected corresponding to the corrected propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(16) Further, in the adaptive modulation control apparatus according to the invention, the modulation parameter determining section is characterized by comprising a correcting section that outputs a correction signal corresponding to the calculated gradient of the function of frequency, and a modulation parameter selecting section that selects a modulation parameter based on the propagation path time extrapolation value and the correction signal.

Thus, since a correction signal is output corresponding to the gradient of the function of frequency, and a modulation parameter is selected based on the propagation path time extrapolation value and the correction signal, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(17) Further, in the adaptive modulation control apparatus according to the invention, the frequency axis gradient calculating section is characterized by calculating the gradient of the function of frequency corresponding to a specific frequency based on a difference between the propagation path estimation information corresponding to a frequency higher than the specific frequency and the propagation path estimation information corresponding to a frequency lower than the specific frequency.

Thus, since the gradient of the function of frequency corresponding to a specific frequency is calculated based on a difference between the propagation path estimation information corresponding to a frequency higher than the specific frequency and the propagation path estimation information corresponding to a frequency lower than the specific frequency, it is possible to obtain the gradient of the function of frequency with simplified processing. For example, when it is assumed that $(p_{n+1})$ is a propagation path state estimated at the frequency higher than the specific frequency, and that $(p_{n-1})$ is a propagation path state estimated at the frequency lower than the specific frequency, the gradient can be obtained as $(p_{n+1}-p_{n-1})/2$. It is thereby possible to simplify the circuit configuration and to realize reductions in power consumption.

(18) Further, in the adaptive modulation control apparatus according to the invention, the frequency axis gradient calculating section is characterized by calculating the gradient of the function of frequency corresponding to a specific frequency based on a difference between an average value of a plurality of pieces of propagation path estimation information corresponding to a plurality of frequencies higher than the specific frequency and an average value of a plurality of pieces of propagation path estimation information corresponding to a plurality of frequencies lower than the specific frequency.

Thus, since the gradient of the function of frequency corresponding to a specific frequency is calculated based on a difference between an average value of a plurality of pieces of propagation path estimation information corresponding to a plurality of frequencies higher than the specific frequency and an average value of a plurality of pieces of propagation path estimation information corresponding to a plurality of frequencies lower than the specific frequency, it is possible to obtain the gradient of the function of frequency with simplified processing. For example, when it is assumed that $\text{avg}(p_{n+k} \sim p_{n+1})$ is an average value of a plurality of pieces of propagation path estimation information corresponding to a plurality of frequencies higher than the specific frequency, and that $\text{avg}(p_{n-1} \sim p_{n-k})$ is an average value of a plurality of pieces of propagation path estimation information corresponding to a plurality of frequencies lower than the specific frequency, the gradient can be obtained as $\{\text{avg}(p_{n+k} \sim p_{n+1}) - \text{avg}(p_{n-1} \sim p_{n-k})\}/2$ or $\{\text{avg}(p_{n+k} \sim p_n) - \text{avg}(p_n \sim p_{n-k})\}/2$. It is thereby possible to simplify the circuit configuration and to realize reductions in power consumption.

(19) Further, in the adaptive modulation control apparatus according to the invention, the correcting section is characterized by not making a correction to change the upper limit or the lower limit of the numerical range of the propagation path state when the calculated gradient of the function of frequency is zero, while making a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of frequency is higher.

Thus, when the calculated gradient of the function of frequency is zero, since the estimation error of the propagation path and the variation speed of the propagation path characteristics are zero or near zero, it is not necessary to make a correction. Meanwhile, since a correction is made to change at least one of the upper limit and the lower limit of the numerical range so as to shift the numerical range of the propagation path state in one-to-one correspondence with each of the modulation parameters in the direction of a better propagation path state as the absolute value of the calculated gradient of the function of frequency is higher, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast.

(20) Further, in the adaptive modulation control apparatus according to the invention, the correcting section is characterized by beforehand determining a maximum value of a correction width of the correction, and when the gradient of the function of frequency is discontinuous at a specific frequency, making a correction to change at least one of the upper limit and the lower limit of the numerical range so that the correction width of the correction is the maximum value.

Thus, when the gradient of the function of frequency is discontinuous at a specific frequency, since a correction is made to change at least one of the upper limit and the lower limit of the numerical range so that the correction width is a predetermined maximum value, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast.

(21) Further, in the adaptive modulation control apparatus according to the invention, the correcting section is characterized by making a correction, when the gradient of the function of frequency is discontinuous at a specific frequency, to change the upper limit of the numerical range of the propagation path state corresponding to modulation parameters used in the case of poor propagation path state, so that the numerical range of the propagation path state corresponding to the modulation parameters used in the case of poor propagation path state is across all the numerical range of the propagation path state.

Thus, when the gradient of the function of frequency is discontinuous at a specific frequency, a correction is made to change the upper limit of the numerical range of the propagation path state corresponding to modulation parameters used in the case of poor propagation path state, so that the numerical range of the propagation path state corresponding to the modulation parameters used in the case of poor propagation path state is across all the numerical range of the propagation path state. Therefore, when the state of the propagation path is estimated to be poor, a modulation parameter with a low error rate i.e. low transmission rate is always selected. By this means, it is possible to prevent the communication performance capabilities from deteriorating even in the cases that the estimation error of the propagation path is significant, and that the variation speed of the propagation path characteristics is fast.

(22) Further, in the adaptive modulation control apparatus according to the invention, the correcting section is characterized by determining a correction width based on a distribution of the variation speed of the propagation path state corresponding to the calculated gradient of the function of frequency, and making a correction to change at least one of the upper limit and the lower limit of the numerical range.

Thus, since a correction width is determined based on the distribution of the variation speed of the propagation path state corresponding to the gradient of the function of frequency, and a correction is made to change at least one of the upper limit and the lower limit of the numerical range, it is possible to make a correction corresponding to the moving speed and an update period of the modulation parameter. In other words, it has been shown that the distribution of the variation speed of the propagation path state corresponding to the gradient of the function of frequency varies with the moving speed and the update period of the modulation parameter by the inventors of the invention. Accordingly, by determining a correction width according to the distribution of the variation speed of the propagation path state corresponding to the gradient of the function of frequency, it is possible to make a suitable correction. As a result, it is possible to use a suitable modulation parameter in response to the estimation error of the propagation path and the variation speed of the propagation path characteristics. By this means, it is possible to prevent the communication performance capabilities from deteriorating even in the cases that the estimation error of the propagation path is significant, and that the variation speed of the propagation path characteristics is fast.

(23) Further, in the adaptive modulation control apparatus according to the invention, the correcting section is characterized by calculating an average value of the distribution of the variation speed of the propagation path state corresponding to the calculated gradient of the function of frequency for each calculated gradient of the function of frequency, and setting the correction width at the average value.

Thus, since the correction width is set at the average value of the distribution of the variation speed of the propagation path state corresponding to the gradient of the function of frequency, it is possible to make a suitable correction corresponding to the moving speed and an update period of the modulation parameter. As a result, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(24) Further, in the adaptive modulation control apparatus according to the invention, the correcting section is characterized by calculating a median value of the distribution of the variation speed of the propagation path state corresponding to the calculated gradient of the function of frequency for each calculated gradient of the function of frequency, and setting the correction width at the median value.

Thus, since the correction width is set at the median value of the distribution of the variation speed of the propagation path state corresponding to the gradient of the function of frequency, it is possible to make a suitable correction corresponding to the moving speed and an update period of the modulation parameter. As a result, it is possible to use a suitable modulation parameter in response to the estimation error of the propagation path and the variation speed of the propagation path characteristics. By this means, it is possible to prevent the communication performance capabilities from deteriorating even in the cases that the estimation error of the propagation path is significant, and that the variation speed of the propagation path characteristics is fast.

(25) Further, in the adaptive modulation control apparatus according to the invention, the correcting section is characterized by calculating a cumulative probability from a maximum value of the variation speed in the direction in which the propagation path state is improved in the distribution of the variation speed of the propagation path state for the calculated gradient of the function of frequency, for each calculated gradient of the function of frequency, and setting the correction width for each gradient of the function of frequency at a value of the variation speed of the propagation path state having the same cumulative probability.

Thus, since the correction width for each gradient of the function of frequency is set at a value of the variation speed having the same cumulative probability from the maximum value of the variation speed in the direction in which the propagation path state is improved in the distribution of the variation speed of the propagation path state for the gradient of the function of frequency, it is possible to make a suitable correction corresponding to the moving speed and an update period of the modulation parameter. As a result, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(26) Further, in the adaptive modulation control apparatus according to the invention, the correcting section is characterized by determining a correction width based on a distribution of a difference value between the propagation path time extrapolation value corresponding to the calculated gradient of the function of frequency and a value indicating the propagation path state at the target time of prediction by the extrapolation, and based on the correction width, making a correction to change at least one of the upper limit and the lower limit of the numerical range.

Thus, since the correction width is determined based on the distribution of the difference value between the propagation path time extrapolation value corresponding to the gradient of the function of frequency and the value indicating the propagation path state at the target time of prediction by the extrapolation, it is possible to make a suitable correction, and to select a modulation parameter corresponding to the corrected numerical range of the propagation path state including the propagation path time extrapolation value. As a result, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast. In addition, the value indicating the propagation path state includes the estimation result and measurement result of the propagation path state.

(27) Further, in the adaptive modulation control apparatus according to the invention, the correcting section is characterized by calculating an average value of the distribution of the difference value between the propagation path time extrapolation value corresponding to the calculated gradient of the function of frequency and the value indicating the propagation path state at the target time of prediction by the extrapolation, for each calculated gradient of the function of frequency, and setting the correction width at the average value.

Thus, since the correction width is set at an average value of the distribution of the difference value between the propagation path time extrapolation value corresponding to the gradient of the function of frequency and the value indicating the propagation path state at the target time of prediction by the extrapolation, it is possible to make a suitable correction corresponding to the moving speed and an update period of the modulation parameter. As a result, it is possible to use a suitable modulation parameter in response to the estimation error of the propagation path and the variation the speed of propagation path characteristics. By this means, it is possible to prevent the communication performance capabilities from deteriorating by making a correction, even in the cases that the estimation error of the propagation path is significant, and that the variation speed of the propagation path characteristics is fast. In addition, the value indicating the propagation path state includes the estimation result and measurement result of the propagation path state.

(28) Further, in the adaptive modulation control apparatus according to the invention, the correcting section is characterized by calculating a median value of the distribution of the difference value between the propagation path time extrapolation value corresponding to the calculated gradient of the function of frequency and the value indicating the propagation path state at the target time of prediction by the extrapolation, for each calculated gradient of the function of frequency, and setting the correction width at the median value.

Thus, since the correction width is set at a median value of the distribution of the difference value between the propagation path time extrapolation value corresponding to the gradient of frequency and the value indicating the propagation path state at the target time of prediction by the extrapolation, it is possible to make a suitable correction corresponding to the moving speed and an update period of the modulation parameter. As a result, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast. In addition, the value indicating the propagation path state includes the estimation result and measurement result of the propagation path state.

(29) Further, in the adaptive modulation control apparatus according to the invention, the correcting section is characterized by calculating a cumulative probability from a maximum value of values such that the value indicating the propagation path state at the target time of prediction by the extrapolation is better than the propagation path time extrapolation value in the distribution of the difference value between the propagation path time extrapolation value corresponding to the calculated gradient of the function of frequency and the value indicating the propagation path state at the target time of prediction by the extrapolation, for each calculated gradient of the function of frequency, and setting the correction width for each gradient of the function of frequency at the difference value having the same cumulative value.

Thus, since the correction width for each gradient of the function of frequency is set at the difference value having the same cumulative probability from the maximum value of values such that the measurement result of the propagation path state at the target time of prediction by the extrapolation is better than the propagation path time extrapolation value in the distribution of the difference value between the propagation path time extrapolation value corresponding to the gradient of the function of frequency and the value indicating the propagation path state at the target time of prediction by the extrapolation, it is possible to make a suitable correction corresponding to the moving speed and an update period of the modulation parameter. As a result, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast. In addition, the value indicating the propagation path state includes the estimation result and measurement result of the propagation path state.

(30) Further, in the adaptive modulation control apparatus according to the invention, the frequency axis gradient calculating section is characterized by beforehand determining a maximum value of a correction width of the correction, and when the gradient of the function of frequency is discontinuous at a specific frequency, outputting a signal to the correcting section to instruct to make a correction to change at least one of the upper limit and the lower limit of the numerical range so that the correction width of the correction is the maximum value.

Thus, when the gradient of the function of frequency is discontinuous at a specific frequency, since the correcting section makes a correction to change at least one of the upper limit and the lower limit of the numerical range so that the correction width is a predetermined maximum value, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast.

(31) Further, in the adaptive modulation control apparatus according to the invention, the frequency axis gradient calculating section is characterized by outputting a signal to the correcting section, when the gradient of the function of frequency is discontinuous at a specific frequency, to instruct to make a correction to change the upper limit of the numerical range of the propagation path state corresponding to modulation parameters used in the case of poor propagation path state, so that the numerical range of the propagation path state corresponding to the modulation parameters used in the case of poor propagation path state is across all the numerical range of the propagation path state.

Thus, when the gradient of the function of frequency is discontinuous at a specific frequency, a correction is made to change the upper limit of the numerical range corresponding to modulation parameters used in the case of poor propagation path state, so that the numerical range corresponding to the modulation parameters used in the case of poor propagation path state is across all the numerical range of the propagation path state. Therefore, when the state of the propagation path is estimated to be poor, a modulation parameter with a low error rate i.e. low transmission rate is always selected. By this means, it is possible to prevent the communication performance capabilities from deteriorating even in the cases that the estimation error of the propagation path is significant, and that the variation speed of the propagation path characteristics is fast.

(32) Further, in the adaptive modulation control apparatus according to the invention, the time axis gradient calculating section is characterized by calculating the gradient of the function of time corresponding to specific time based on a difference between the propagation path estimation information at the specific time and stored past propagation path estimation information.

Thus, since the gradient of the function of time corresponding to specific time is calculated based on a difference between the propagation path estimation information at the specific time and the stored past propagation path estimation information, it is possible to obtain the gradient of the function of time with simplified processing. For example, when it is assumed that $(p_t)$ is the propagation path state estimation information at specific time, and that $(p_{t-1}$ or $p_{t-k})$ is a past estimation result (not limited to one) of the propagation path state stored in the storage section, the gradient can be obtained as $(p_t - p_{t-1})$, or $(p_t - p_{t-k})/k$. It is thereby possible to simplify the circuit configuration and to realize reductions in power consumption.

(33) Further, in the adaptive modulation control apparatus according to the invention, the correcting section is characterized by not making a correction to change the upper limit or the lower limit of the numerical range of the propagation path state when the calculated gradient of the function of time is zero, and when the calculated gradient of the function of time is negative, making a correction to change at least one of the upper limit and the lower limit of the numerical range so as to shift the numerical range of the propagation path state in one-to-one correspondence with each of the modulation parameters in the direction of a better propagation path state as an absolute value of the gradient is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the gradient is higher.

Thus, when the calculated gradient of the function of time is zero, since the estimation error of the propagation path and the variation speed of the propagation path characteristics are zero or near zero, it is not necessary to make a correction. Meanwhile, when the calculated gradient of the function of time is negative, since a correction is made to change at least one of the upper limit and the lower limit of the numerical range so as to shift the numerical range of the propagation path state in one-to-one correspondence with each of the modulation parameters in the direction of a better propagation path state as the absolute value of the gradient is higher, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast. Further, when the calculated gradient of the function of time is positive, since a correction is made to change at least one of the upper limit and the lower limit of the numerical range so as to shift the numerical range of the propagation path state in one-to-one correspondence with each of the modulation parameters in the direction of a poorer propagation path state as the absolute value of the gradient is higher, it is made easier to select a modulation parameter with a high transmission rate. By this means, when the state of the propagation path is expected to vary better, it is possible to enhance the transmission efficiency while guaranteeing the communication performance capabilities.

(34) Further, in the adaptive modulation control apparatus according to the invention, the correcting section is characterized by not making a correction to change the upper limit or the lower limit of the numerical range of the propagation path state when the calculated gradient of the function of frequency is zero and the calculated gradient of the function of time is zero, and when the calculated gradient of the function of time is negative, making a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of time is higher and an absolute value of the calculated gradient of the function of frequency is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the calculated gradient of the function of frequency is lower.

Thus, when the calculated gradient of the function of frequency is zero and the calculated gradient of the function of time is zero, since the estimation error of the propagation path and the variation speed of the propagation path characteristics are zero or near zero, it is not necessary to make a correction. Meanwhile, when the calculated gradient of the function of time is negative, since a correction is made to change at least one of the upper limit and the lower limit of the numerical range so as to shift the numerical range of the propagation path state in one-to-one correspondence with each of the modulation parameters in the direction of a better propagation path state as the absolute value of the calculated gradient of the function of time is higher and the absolute value of the calculated gradient of the function of frequency is higher, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast. Further, when the calculated gradient of the function of time is positive, since a correction is made to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the calculated gradient of the function of frequency is lower, it is made easier to select a modulation parameter with a high transmission rate. By this means, when the state of the propagation path is expected to vary better, it is possible to enhance the transmission efficiency while guaranteeing the communication performance capabilities.

(35) Further, in the adaptive modulation control apparatus according to the invention, the correcting section is characterized by not making a correction to change the upper limit or the lower limit of the numerical range of the propagation path state when the calculated gradient of the function of frequency is zero and the calculated gradient of the function of time is zero, and when the calculated gradient of the function of time is negative, making a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of time is higher and an absolute value of the calculated gradient of the function of frequency is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the calculated gradient of the function of frequency is higher.

Thus, when the calculated gradient of the function of frequency is zero and the calculated gradient of the function of time is zero, since the estimation error of the propagation path and the variation speed of the propagation path characteristics are zero or near zero, it is not necessary to make a correction. Meanwhile, when the calculated gradient of the function of time is negative, since a correction is made to change at least one of the upper limit and the lower limit of the numerical range so as to shift the numerical range of the propagation path state in one-to-one correspondence with each of the modulation parameters in the direction of a better propagation path state as the absolute value of the calculated gradient of the function of time is higher and the absolute value of the calculated gradient of the function of frequency is higher, it is made easier to select a modulation parameter with a low error rate i.e. low transmission rate. By this means, it is possible to prevent the communication performance capabilities from deteriorating even in the cases that the estimation error of the propagation path is significant, and that the variation speed of the propagation path characteristics is fast. Further, when the calculated gradient of the function of time is positive, since a correction is made to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the gradient of the function of frequency is higher, it is made easier to select a modulation parameter with a high transmission rate. By this means, when the state of the propagation path is expected to vary better, it is possible to enhance the transmission efficiency while guaranteeing the communication performance capabilities.

(36) Further, the adaptive modulation control apparatus according to the invention is characterized by further comprising a moving speed estimating section that estimates a moving speed, where the correcting section further changes an amount to correct corresponding to the moving speed estimated in the moving speed estimating section.

Thus, since the amount to correct is further varied corresponding to the estimated moving speed, it is possible to make a suitable correction corresponding to the moving speed.

(37) Further, the adaptive modulation control apparatus according to the invention is characterized by further comprising a Doppler frequency estimating section that estimates a Doppler frequency, where the correcting section further changes an amount to correct corresponding to the Doppler frequency estimated in the Doppler frequency estimating section.

Thus, since the amount to correct is further varied corresponding to the estimated Doppler frequency, it is possible to make a suitable correction corresponding to the Doppler frequency.

(38) Further, in the adaptive modulation control apparatus according to the invention, the correcting section is characterized by changing an amount to correct corresponding to an interval of communications.

Thus, since the amount to correct is varied corresponding to the interval of communications, it is possible to make a suitable correction corresponding to the interval of communications. In other words, when the interval of communications is large, by increasing the degree of correction, it is possible to prevent the communication performance capabilities from deteriorating by making a correction, even in the cases that the estimation error of the propagation path is significant, and that the variation speed of the propagation path characteristics is fast. Meanwhile, when the interval of communications is small, by decreasing the degree of correction, it is possible to enhance the transmission efficiency while guaranteeing the communication performance capabilities.

(39) A wireless communication apparatus according to the invention is characterized by comprising at least a transmitting/receiving section that performs transmission and reception of a radio signal, and the adaptive modulation control apparatus as described in any one of claims 1 to 38, where the transmitting/receiving section receives the propagation path estimation information indicative of an estimation result of a propagation path state from a communicating party.

According to this configuration, a modulation parameter can be selected based on the propagation path estimation information indicative of an estimation result of a propagation path received from a communicating party. By this means, by calculating a gradient of the function of frequency corresponding to each frequency when the propagation path estimation information is set to be the function of frequency, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of frequency, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

(40) A wireless communication apparatus according to the invention is characterized by comprising at least a transmitting/receiving section that performs transmission and reception of a radio signal, a propagation path estimating section that estimates a state of a propagation path based on propagation path estimation information indicative of a result of measurement of the propagation path state received in the transmitting/receiving section from a communicating party, and the adaptive modulation control apparatus as described in any one of claims 1 to 38.

According to this configuration, the state of the propagation path is estimated based on the propagation path estimation information received from a communicating party, and a modulation parameter can be selected based on the estimation result of the propagation path. By this means, by calculating a gradient of the function of frequency corresponding to each frequency when the propagation path estimation information is set to be the function of frequency, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of frequency, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

Advantageous Effect of the Invention

According to the invention, by calculating a gradient of the function of frequency corresponding to each frequency when the propagation path estimation information is set to be the function of frequency, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of frequency, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

BEST MODE FOR CARRYING OUT THE INVENTION

The inventors of the present invention found out that there is a tendency that an error is increased as the absolute value of the gradient in the frequency axis direction of the propagation path state increases in estimation of the propagation path state. FIG. 1 is a graph showing a case where an error shifting in the frequency axis direction occurs in the estimation result of the propagation path state. In addition, in FIG. 1, CNR is used as a value representing the propagation path state. In FIG. 1, while alternate long and short dashed lines are of accurate propagation path state, and the solid line shifted in the frequency axis direction by +Δf is of the estimation result, it is understood that the estimation error e61 at the frequency f61 where the absolute value of the gradient of the frequency axis is large is larger the estimation error e62 at the frequency f62 where the absolute value of the gradient is small.

Further, the inventors of the invention found out that the probability that the variation of the propagation path state is faster as the absolute value of the gradient in the frequency axis direction is larger. FIG. 2 is a graph showing results, obtained by computer simulations of an OFDM communication system, of the relationship between the gradient in the frequency axis direction of the propagation path state and the variation speed of the propagation path state in an example of multipath Rayleigh fading propagation path. The horizontal axis of the graph in FIG. 2 represents a variation amount i.e. variation speed of the propagation path state (herein, signal power) per OFDM symbol time T symbol, and the vertical axis represents the cumulative probability where the variation speed appears. In the graph of FIG. 2, simulation results are shown in the case of different gradients in the frequency axis direction i.e. in the case of the variation amount of the propagation path state per subcarrier interval Fsc and in the case (hereinafter, referred to as a "specific point") where the gradient of the function of frequency is discontinuous. As shown in FIG. 2, the probability that the variation speed of the propagation path state is faster is higher as the gradient in the frequency axis direction is larger, and is further high at the specific point.

In the invention, calculated is a gradient of the function of frequency or time corresponding to each frequency or each time when the propagation path estimation information is set to be the function of frequency or time, and a correction is made to change the upper limit or the lower limit of the numerical range of the propagation path state in one-to-one correspondence with each of the modulation parameters (MCS: Modulation and Coding Scheme) corresponding to the calculated gradient of the function of frequency or time. Then, a modulation parameter is selected corresponding to the corrected numerical range of the propagation path state including the propagation path estimation information.

In addition, such modulation parameters include a carrier hole without data, and the carrier hole may be assigned as a modulation parameter with the lowest transmission rate.

In the specification, it is intended that "gradient of the function of frequency" means "gradient in the frequency axis direction", and that "gradient of the function of time" means "gradient in the time axis direction".

First Embodiment

FIG. 3 is a block diagram illustrating a schematic configuration of an adaptive modulation control apparatus according to the first embodiment of the invention. Described herein is the case of applying the invention to an OFDM subcarrier adaptive modulation system. In FIG. 3, a propagation path estimating circuit 10 receives information such as, for example, CNR, delay profile or the like of a reception signal transmitted as feedback from a receiver, estimates the propagation path state from the information of the reception signal, and outputs the estimation result. A frequency axis gradient calculating circuit 11 obtains a gradient in the frequency axis direction of the propagation path state in each subcarrier from the estimation result of the propagation path state in the propagation path estimating circuit 10. A correcting circuit 12 makes a correction of a relational equation or table to select a modulation parameter or generation of a correction signal of the selected modulation parameter from the gradient in the frequency axis direction obtained in the frequency axis gradient calculating section 11. A modulation parameter selecting circuit 13 selects a modulation parameter from the estimation result of the propagation path state and the correction result or correction signal in the correcting circuit 12. A subcarrier adaptive modulation and coding circuit 14 receives transmission data, and performs adaptive modulation on the transmission data for each subcarrier corresponding to the modulation parameter selected in the modulation parameter selecting circuit 13. An IFFT circuit 15 performs inverse Fourier transform on an output signal of the subcarrier adaptive modulation and coding circuit 14 to transform into a digital OFDM signal. A D/A conversion circuit 16 coverts the digital OFDM signal into an analog signal.

In addition, the correcting circuit 12 and modulation parameter selecting circuit 13 constitute a modulation parameter determining section 300.

Herein, the adaptive modulation control apparatus according to the first embodiment may be provided with storing means of the propagation path estimation result to use an average value of some past results, as a propagation path estimation result in obtaining the gradient of the frequency axis. It is thereby possible to average noise components.

According to the adaptive modulation control apparatus according to the first embodiment, corresponding to the gradient in the frequency axis direction of the estimation result of the propagation path state, the relational equation or table to select a modulation parameter, or selected modulation parameter is: (1) not corrected when the gradient is zero; and (2) as the absolute value of the gradient is higher, corrected to select a modulation parameter with a lower error rate (lower transmission rate) even in the same propagation path state. By this means, it is possible to provide modulation parameter selection with an allowance corresponding to the degree of the estimation error of the propagation path state. Therefore, it is possible to select a safer modulation parameter when the estimation error is (judged to be) large, while selecting a modulation parameter not to decrease transmission efficiency unnecessarily when the estimation error is (judged to be) small.

Further, at the specific point such as f71 in FIG. 4 where prior and subsequent gradients are discontinue in the frequency axis direction, since the estimation error of the propagation path state is particularly large, the maximum correction is made, and a safe modulation parameter is thereby selected.

By this means, it is possible to suppress deterioration of communication performance capabilities such as degradation of error rate characteristics, decreases in throughput and the like, due to selection of an unsuitable modulation parameter caused by the estimation error.

Described next is a method of correction (method of determining a correction value) by the gradient in the frequency axis direction in the correcting circuit 12. For example, following methods are considered as the method of correction.

Example 1

The relationship between the gradient in the frequency axis direction of the propagation path state and the estimation error in the propagation path estimating circuit 10 is obtained by experiments, computer simulations and the like. Next, the relational equation or table to select the modulation parameter is shifted in the direction of better (safer) error rate characteristics by the estimation error corresponding to the obtained gradient in the frequency axis direction, or the selected modulation parameter is shifted. In addition, the correction of the maximum value of the error estimation error is made in the specific point.

Example 2

The maximum value of the estimation error in the propagation path estimating circuit 10 is obtained by experiments, computer simulations and the like. Next, a maximum threshold (largest correction width) is obtained for the absolute value of the gradient in the frequency axis direction. When the absolute value of the gradient in the frequency axis direction is the maximum threshold or more or the specific point, the relational equation or table to select the modulation parameter is shifted in the direction of better (safer) error rate characteristics by the obtained maximum value of the estimation error, or the selected modulation parameter is shifted. When the absolute value of the gradient in the frequency axis direction is less than the maximum threshold, the relational equation or table to select the modulation parameter is shifted in the direction of better (safer) error rate characteristics by a value obtained by multiplying the maximum value of the estimation error by a ratio to the maximum threshold, or the selected modulation parameter is shifted.

Described next is the correction based on the gradient in the frequency axis direction. FIG. 5 is a graph showing an example of the estimation result of the propagation path state. In FIG. 5, CNR is used to represent the propagation path state, and CNR is expressed as the function of frequency. In FIG. 5, it is assumed that the gradient in the frequency axis direction of the propagation path state at the frequency f41 is g41, and that the gradient at the frequency f42 is g42.

FIGS. 6(a) and 6(b) show graphs for correcting the relationship between the propagation path state and modulation parameter (MCS) selection based on the estimation result of the propagation path state as shown in FIG. 5. Also in FIG. 6, CNR is used as a value representing the propagation path state. Further, as an example, the graphs show the case where a modulation parameter is selected from four (1, 2, 3 and 4) modulation parameters, and p51, p52 and p53 are given as thresholds (upper limits) in selecting respective modulation parameters. In other words, the numerical range of CNR is determined in one-to-one correspondence with each of the modulation parameters, and the modulation parameter of "1" corresponds to the numerical range of CNR from 0 to less than p51. The modulation parameter of "2" corresponds to the numerical range of CNR from p51 to less than p52. The modulation parameter of "3" corresponds to the numerical range of CNR from p52 to less than p53. The modulation parameter of "4" corresponds to the numerical range of CNR of p53 or more. For example, when the estimated CNR is included in the numerical range of CNR from p51 to less than p52, the modulation parameter is "2".

Then, FIG. 6(a) shows the correction corresponding to f41 as shown in FIG. 5, while FIG. 6(a) shows the correction corresponding to f42 as shown in FIG. 5. In f41 and f42 in FIG. 5, the estimation result of the propagation path state is the same value of p40, but absolute values of the gradients are |g41|>|g42|. Accordingly, the correction is made to shift the numerical range of CNR in the direction of a better propagation path state, so that a modulation parameter with a lower error rate i.e. lower transmission rate is selected in f41 than in f42. More specifically, in FIG. 6(a), correction widths (p51'-p51), (p52'-p52) and (p53'-p53) of the threshold are respectively larger than correction widths (p51"-p51), (p52"-p52) and (p53"-p53) of the threshold in FIG. 6(b).

As described above, according to the adaptive modulation control apparatus according to the first embodiment, by calculating the gradient of the function of frequency corresponding to each frequency when the propagation path estimation information is set to be the function of frequency, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of frequency, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

Second Embodiment

FIG. 7 is a block diagram illustrating a schematic configuration of an adaptive modulation control apparatus according to the second embodiment. Herein, an apparatus configuration example is described in the case of applying the invention to an OFDM subcarrier adaptive modulation system. A propagation path estimating circuit 70 receives information such as, for example, CNR, delay profile or the like of a reception signal transmitted as feedback from a receiver, and estimates the propagation path state from the information of the reception signal. A storage circuit 71 stores one or plurality of estimation results of the propagation path state by the propagation path estimating circuit 70. A time axis gradient calculating circuit 72 obtains a gradient in the time axis direction of the propagation path state in each subcarrier from the estimation result of the propagation path state from the propagation path estimating circuit 70 and the past estimation results of the propagation path state stored in the storage circuit 71.

A correcting circuit 73 makes a correction of a relational equation or table to select a modulation parameter or generation of a correction signal of the selected modulation parameter from the gradient in the time axis direction obtained in the time axis gradient calculating section 72. A modulation parameter selecting circuit 74 selects a modulation parameter from the estimation result of the propagation path state in the propagation path estimating circuit 70 and the correction result or correction signal in the correcting circuit 73. A subcarrier adaptive modulation and coding circuit 75 receives transmission data, and performs adaptive modulation on the transmission data for each subcarrier corresponding to the modulation parameter selected in the modulation parameter selecting circuit 74. An IFFT circuit 76 performs inverse Fourier transform on an output of the subcarrier adaptive modulation and coding circuit 75 to transform into a digital OFDM signal. A D/A conversion circuit 77 coverts the digital OFDM signal into an analog signal.

In addition, the correcting circuit 73 and modulation parameter selecting circuit 74 constitute a modulation parameter determining section 700.

The adaptive modulation control apparatus according to the second embodiment corrects the relational equation or table to select a modulation parameter, or selected modulation parameter, corresponding to the gradient in the time axis direction. In other words, (1) when the gradient in the time axis direction is zero, the correction is not made. (2) When the gradient in the time axis direction is negative, the relational equation or table, or selected modulation parameter is corrected so that a modulation parameter with a lower error rate (lower transmission rate) is selected even in the same propagation path state, as the absolute value of the gradient is higher. (3) When the gradient in the time axis direction is positive, the relational equation or table, or selected modulation parameter is corrected so that a modulation parameter with a higher transmission rate is selected even in the same propagation path state, as the absolute value of the gradient is higher. By this means, it is possible to make a correction to modulation parameter selection based on the prediction of the direction and speed such that the actual propagation path state varies for a period during which the modulation parameter is selected based on the propagation path estimation result and transmission is performed.

As described above, according to the adaptive modulation control apparatus according to the second embodiment, by calculating the gradient of the function of time corresponding to each time when the propagation path estimation information is set to be the function of time, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of time, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

Third Embodiment

FIG. 8 is a block diagram illustrating a schematic configuration of an adaptive modulation control apparatus according to the third embodiment. Herein, an apparatus configuration example is described in the case of applying the invention to an OFDM subcarrier adaptive modulation system. A propagation path estimating circuit 80 receives information such as, for example, CNR, delay profile or the like of a reception signal transmitted as feedback from a receiver, and estimates the propagation path state from the information of the reception signal. A storage circuit 81 stores one or plurality of estimation results of the propagation path state by the propagation path estimating circuit 80. A time axis gradient calculating circuit 82 obtains a gradient in the time axis direction of the propagation path state in each subcarrier from the estimation result of the propagation path state from the propagation path estimating circuit 80 and the past estimation results of the propagation path state stored in the storage circuit 81. A frequency axis gradient calculating circuit 83 obtains a gradient in the frequency axis direction of the propagation path state in each subcarrier from the estimation result of the propagation path state in the propagation path estimating circuit 80.

A correcting circuit 84 makes a correction of a relational equation or table to select a modulation parameter or generation of a correction signal of the selected modulation parameter from the gradient in the frequency axis direction and the gradient in the time axis direction. A modulation parameter selecting circuit 85 selects a modulation parameter from the estimation result of the propagation path state in the propagation path estimating circuit 80 and the correction result or correction signal in the correcting circuit 84. A subcarrier adaptive modulation and coding circuit 86 receives transmission data, and performs adaptive modulation on the transmission data for each subcarrier corresponding to the modulation parameter selected in the modulation parameter selecting circuit 85. An IFFT circuit 87 performs inverse Fourier transform on an output of the subcarrier adaptive modulation and coding circuit 86 to transform into a digital OFDM signal. A D/A conversion circuit 88 coverts the digital OFDM signal into an analog signal.

In addition, the correcting circuit 84 and modulation parameter selecting circuit 85 constitute a modulation parameter determining section 800.

The adaptive modulation control apparatus according to the third embodiment corrects the relational equation or table to select a modulation parameter, or selected modulation parameter, corresponding to the gradient in the frequency axis direction and the gradient in the time axis direction of the estimation result of the propagation path state as follows: (1) When both the gradient in the frequency axis direction and the gradient in the time axis direction are zero, the correction is not made. (2) When the gradient in the time axis direction is negative, the relational equation or table, or selected modulation parameter is corrected so that a modulation parameter with a lower error rate (lower transmission rate) is selected even in the same propagation path state, as the absolute value of the gradient in the time axis direction is higher and the absolute value of the gradient in the frequency axis direction is higher. (3) When the gradient in the time axis direction is positive, the relational equation or table, or selected modulation parameter is corrected so that a modulation parameter with a higher transmission rate is selected even in the same propagation path state, as the absolute value of the gradient in the time axis direction is higher and the absolute value of the gradient in the frequency axis direction is lower. For (3) as described above, (4) when the gradient in the time axis direction is positive, the relational equation or table, or selected modulation parameter may be corrected so that a modulation parameter with a higher transmission rate is selected even in the same propagation path state, as the absolute value of the gradient in the time axis direction is higher and the absolute value of the gradient in the frequency axis direction is higher.

FIG. 9 is a diagram showing the method of determining a correction width corresponding to the gradient in the frequency axis direction and the gradient in the time axis direction.

(1) As shown in the center of FIG. 9, when both the gradient in the frequency axis direction and the gradient in the time axis direction are zero, the correction is not made. (2) Further, as shown on the lower side of FIG. 9, when the gradient in the time axis direction is negative, the relational equation or table, or selected modulation parameter is corrected so that a modulation parameter with a lower error rate (lower transmission rate) is selected even in the same propagation path state, as the absolute value of the gradient in the time axis direction is higher and the absolute value of the gradient in the frequency axis direction is higher. (3) Furthermore, as shown by the arrow from lower right to upper left on the upper side of FIG. 9, when the gradient in the time axis direction is positive, the relational equation or table, or selected modulation parameter is corrected so that a modulation parameter with a higher transmission rate is selected even in the same propagation path state, as the absolute value of the gradient in the time axis direction is higher and the absolute value of the gradient in the frequency axis direction is lower. This correction is effective when the gradient in the frequency axis direction primarily has a strong correlation with the estimation error of the propagation path state.

(4) Still furthermore, when the gradient in the time axis direction is positive, the relational equation or table, or selected modulation parameter is corrected so that a modulation parameter with a higher transmission rate is selected even in the same propagation path state, as the absolute value of the gradient in the time axis direction is higher and the absolute value of the gradient in the frequency axis direction is higher. This correction is effective when the gradient in the frequency axis direction primarily has a strong correlation with the variation speed of the propagation path state.

Such corrections enable modulation parameter selection in consideration of the prediction of the direction and speed such that the actual propagation path state varies for a period of time during which the modulation parameter is selected based on the estimation result and transmission is performed, and of an allowance corresponding to the degree of the estimation error of the propagation path state.

As described above, according to the adaptive modulation control apparatus according to the third embodiment, by calculating the gradient of the function of time corresponding to each frequency when the propagation path estimation information is set to be the function of frequency, and further calculating the gradient of the function of time corresponding to each time when the propagation path estimation information is set to be the function of time, it is possible to grasp a degree of the estimation error of the propagation path and a degree of the variation speed of the propagation path characteristics. Then, since a correction is made to change the upper limit or the lower limit of the numerical range of the propagation path state in one-to-one correspondence with each of the modulation parameters corresponding to the gradient of the function of frequency and the gradient of the function of time, and a modulation parameter is selected corresponding to the corrected numerical range of the propagation path state including the propagation path estimation information, it is possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

Fourth Embodiment

An adaptive modulation control apparatus according to the fourth embodiment stores the propagation path estimation information indicative of the estimation result of the propagation path state, and calculates the gradient of the function of frequency corresponding to each frequency when the propagation path estimation information is set to be the function of frequency. Further, the apparatus calculates a propagation path time extrapolation value that is a prediction value of the propagation path state at next communication time based on the propagation path estimation information and stored one or a plurality of pieces of propagation path estimation information. Then, the apparatus selects a modulation parameter based on the gradient of the function of frequency and the propagation path time extrapolation value.

FIG. 10 is a block diagram illustrating a schematic configuration of an adaptive modulation control apparatus according to the fourth embodiment of the invention. Herein, an apparatus configuration example is described in the case of applying the invention to an OFDM subcarrier adaptive modulation system. In FIG. 10, a propagation path estimating circuit 100 receives information such as, for example, CNR, delay profile or the like of a reception signal transmitted as feedback from a receiver, estimates the propagation path state from the information of the reception signal, and outputs the estimation result. A frequency axis gradient calculating circuit 101 obtains a gradient in the frequency axis direction of the propagation path state in each subcarrier from the estimation result of the propagation path state in the propagation path estimating circuit 100. A storage circuit 102 stores one or plurality of estimation results of the propagation path state by the propagation path estimating circuit 100. A time extrapolation circuit 103 obtains a propagation path time extrapolation value that is a prediction value of the propagation path state at the time a communication is next performed from the estimation result of the propagation path state from the propagation path estimating circuit 100 and the past estimation result of the propagation path state stored in the storage circuit 102.

A correcting circuit 104 makes a correction of a relational equation or table to select a modulation parameter or generation of a correction signal of the selected modulation parameter from the gradient in the frequency axis direction obtained in the frequency axis gradient calculating section 101. A modulation parameter selecting circuit 105 selects a modulation parameter from the propagation path time extrapolation value and the correction result or correction signal in the correcting circuit 104. A subcarrier adaptive modulation and coding circuit 106 receives transmission data, and performs adaptive modulation on the transmission data for each subcarrier corresponding to the modulation parameter selected in the modulation parameter selecting circuit 105. An IFFT circuit 107 performs inverse Fourier transform on an output signal of the subcarrier adaptive modulation and coding circuit 106 to transform into a digital OFDM signal. A D/A conversion circuit 108 coverts the digital OFDM signal into an analog signal.

In addition, the correcting circuit 104 and modulation parameter selecting circuit 105 constitute a modulation parameter determining section 110.

FIG. 11 is a graph showing a difference value between the propagation path time extrapolation value and a value indicating the propagation path state at the target time of prediction by the extrapolation. Herein, the example is shown using the result of measurement of the propagation path state at the above-mentioned time as the value indicating the propagation path state. In addition, as the value indicating the propagation path state, it is possible to use a result of estimation of the propagation path state at the above-mentioned time. As shown in FIG. 11, the gradient in the frequency axis direction is calculated at time $t_n$. Further, the propagation path time extrapolation value is obtained at time $t_{n+1}$, and at time $t_{n+1}$, a difference value is obtained between the measurement result of the propagation path state at the target time of prediction by the extrapolation and the propagation path time extrapolation value. Then, the correction width is determined based on the difference value and the gradient in the frequency axis direction. Herein, in the case of actually obtaining a difference value between the propagation path time extrapolation value and the measurement (estimation) result of the propagation path state at the target time of prediction by the extrapolation, following methods are adopted: (1) By experiments in actual equipment and/or computer simulations, a difference is obtained between the propagation path time extrapolation value and the propagation path estimation information at the actual target time of the extrapolation; and (2) by computer simulations, a difference is obtained from a propagation path computational value (theoretical computational value by simulations: correct propagation path information) at the actual target time of the extrapolation.

According to the fourth embodiment, by calculating the gradient of the function of frequency corresponding to each frequency when the propagation path estimation information is set to be the function of frequency, it is possible to grasp a degree of the estimation error of the propagation path and a degree of the variation speed of the propagation path characteristics. Further, based on one or a plurality of pieces of past propagation path estimation information, the propagation path time extrapolation value is calculated that is a prediction value of the propagation path state at the next communication time, and a modulation parameter is determined based on the gradient of the function of frequency and the propagation path time extrapolation value. It is thereby possible to use a suitable modulation parameter in response to the estimation error of the propagation path and the variation speed of the propagation path characteristics. By this means, it is possible to prevent the communication performance capabilities from deteriorating by making a correction, even in the cases that the estimation error of the propagation path is significant, and that the variation speed of the propagation path characteristics is fast.

Fifth Embodiment

In each of the above-mentioned embodiments, in determining the correction width, the moving speed of a mobile station apparatus may be considered. In other words, a section is provided to estimate the moving speed of the mobile station apparatus, and the correction width is determined corresponding to the moving speed of the mobile station apparatus estimated in the moving speed estimating section. This is because of using the fact that the distribution of the variation speed of the propagation path varies with the moving speed of the mobile station apparatus. Herein, instead of the moving speed of the mobile station apparatus, a Doppler frequency estimating section may be provided to estimate the Doppler frequency of a reception signal so as to determine the correction width corresponding to the Doppler frequency estimated in the Doppler frequency estimating section. By this means, it is possible to make a correction corresponding to the moving speed of the mobile station apparatus.

For example, FIG. 12 is a diagram showing an example where a Doppler frequency estimating circuit is provided in the adaptive modulation control apparatus according to the first embodiment as shown in FIG. 3. A configuration is adopted where a Doppler frequency estimating circuit 120 is provided to estimate the Doppler frequency based on a reception signal, and the output signal is input to the correcting circuit 12. Further, FIG. 13 is a diagram showing an example where a Doppler frequency estimating circuit 130 is provided in the adaptive modulation control apparatus according to the second embodiment as shown in FIG. 7. A configuration is adopted where a Doppler frequency estimating circuit 130 is provided to estimate the Doppler frequency based on a reception signal, and the output signal is input to the correcting circuit 73. Furthermore, FIG. 14 is a diagram showing an example where a Doppler frequency estimating circuit is provided in the adaptive modulation control apparatus according to the third embodiment as shown in FIG. 8. A configuration is adopted where a Doppler frequency estimating circuit 140 is provided to estimate the Doppler frequency based on a reception signal, and the output signal is input to the correcting circuit 84. Still furthermore, FIG. 15 is a diagram showing an example where a Doppler frequency estimating circuit is provided in the adaptive modulation control apparatus according to the fourth embodiment as shown in FIG. 10. A configuration is adopted where a Doppler frequency estimating circuit 150 is provided to estimate the Doppler frequency based on a reception signal, and the output signal is input to the correcting circuit 104.

FIGS. 16, 17 and 18 are graphs showing results, obtained by computer simulations of an OFDM communication system, of the distribution of the variation speed (hereinafter, simply referred to as a variation speed distribution) of the propagation path state for the gradient in the frequency axis direction of the propagation path state at the Doppler frequency Fd of 20 Hz, 50 Hz or 100 Hz, respectively, in an example of multipath Rayleigh fading propagation path. As shown in FIGS. 16 to 18, the distribution of the variation speed of the propagation path state for the gradient in the frequency axis direction of the propagation path state varies with the Doppler frequency. Based on the variation speed distribution for each Doppler frequency, by varying the correction width corresponding to the estimation result, it is possible to make a correction with high accuracy.

As an example for determining the correction width, there is a method of determining based on an average value in each gradient in the frequency axis direction of the variation speed distribution. FIG. 19 is a graph showing results, obtained by computer simulations, of the average value in each gradient in the frequency axis direction of the variation speed distribution at the Doppler frequency Fd of 20 Hz, 50 Hz or 100 Hz. Based on the results, the correction width corresponding to the estimated Doppler frequency is determined as described below.

(1) The results of FIG. 19 are used without change. In this case, it is necessary to prepare a table and the like. The accuracy is high, but the circuit scale is large.
(2) The results of FIG. 19 are approximated using one or a plurality of straight lines. In this case, the accuracy deteriorates, but it is possible to reduce both the circuit scale and computation amounts.
(3) The results of FIG. 19 are approximated using a polynomial. In this case, the accuracy increases as compared with the case of approximation using a plurality of straight lines, but the circuit scale and computation amounts both increase. In addition, results subjected to approximation using the polynomial may be formed into a table.

Further, as another example for determining the correction width, there is a method of determining based on a distribution of the cumulative probability from the maximum value of the variation speed (positive value) in the direction in which the propagation path state is improved in each gradient in the frequency axis direction of the variation speed distribution. FIG. 20 is a graph showing results, obtained by computer simulations, of the distribution of the cumulative probability (hereinafter, simply referred to as the cumulative probability of the variation speed) from the maximum value of the variation speed (positive value) in the direction in which the propagation path state is improved in the variation speed distribution at the Doppler frequency Fd of 100 Hz. FIG. 21 is a graph showing results, obtained by computer simulations, of the variation speed such that the cumulative probability is 90% at the Doppler frequency Fd of 20 Hz, 50 Hz or 100 Hz.

For example, assuming that the cumulative probability of the variation speed is 90% as a criterion in determining the correction width, based on the results of FIG. 21, the correction width corresponding to the estimated Doppler frequency is determined as described below.
(1) The results of FIG. 21 are used without change. In this case, it is necessary to prepare a table and the like. The accuracy is high, but the circuit scale is large.
(2) The results of FIG. 21 are approximated using one or a plurality of straight lines. In this case, the accuracy deteriorates, but it is possible to reduce both the circuit scale and computation amounts.
(3) The results of FIG. 21 are approximated using a polynomial. In this case, the accuracy increases as compared with the case of approximation using a plurality of straight lines, but the circuit scale and computation amounts both increase. In addition, results subjected to approximation using the polynomial may be formed into a table.

FIG. 22 is a graph showing an example where the results of FIG. 21 are approximated using a plurality of straight lines. As shown in FIG. 22, approximations are made using straight lines, equations of the straight lines are obtained, and the correction width is determined corresponding to the gradient in the frequency axis direction. As a specific method of linear approximations, for example, the following methods are considered.

(Linear Approximation Method 1)

The gradient in the frequency axis direction is divided into a plurality of regions, using points such that the gradient variation is large in the curve of the cumulative probability distribution of the variation speed i.e. points such that the two time derivative value is large, as boundaries. Then, linear approximations are made for each of the plurality of regions by the least square method or the like.

(Linear Approximation Method 2)

The gradient in the frequency axis direction is divided into a plurality of regions, using points such that the gradient variation is large in the curve of the cumulative probability distribution of the variation speed i.e. points such that the two time derivative value is large, as boundaries. Next, a value of a boundary point of each region, for example, the average value is obtained, and the points are connected using straight lines.

Further, the cumulative probability as a criterion in determining the correction width may be varied with the Doppler frequency. For example, the cumulative probability as a criterion is increased, as the Doppler frequency is higher. Since the dispersion of the variation speed distribution is increased (FIGS. 16 to 18) as the Doppler frequency is higher, inhibition on improvements in the performance is increased due to points out of the cumulative probability as a criterion. By selecting a cumulative probability containing a wider range in the variation speed distribution as the Doppler frequency is higher, it is possible to reduce the inhibition on improvements in performance.

Meanwhile, when the Doppler frequency is low, since the dispersion of the variation speed is small, the inhibition is small on improvements in the performance due to points out of the cumulative probability as a criterion, and by selecting a cumulative probability containing a narrower range in the variation speed distribution, it is possible to increase the effect of improving the performance.

FIG. 23 is a graph showing an example of results, obtained by computer simulations, of characteristics of throughput for the cumulative probability of the variation speed as a criterion in determining the correction width at the Doppler frequency Fd of 50 Hz or 100 Hz. According to the results of FIG. 23, it is possible to obtain an optimal value of the cumulative probability of the variation speed as a criterion in determining the correction width. Further, it is understood that the optimal value of the cumulative probability of the variation speed as a criterion varies with the Doppler frequency.

In addition, in each of the above-mentioned embodiments, when it is noted that the propagation path state varies with time, it is also possible to determine the correction width corresponding to an update period of the modulation parameter. In other words, the size of correction width is varied corresponding to the time elapsing before a communication is actually performed using the selected modulation parameter i.e. communication interval. For example, when the communication interval is large, the degree of correction is increased, and it is thereby possible to prevent the communication performance capabilities from deteriorating by making a correction, even in the cases that the estimation error of the propagation path is significant, and that the variation speed of the propagation path characteristics is fast. Meanwhile, when the communication interval is small, the degree of correction is decreased, and it is possible to enhance the transmission efficiency while guaranteeing the communication performance capabilities.

Further, the correction width can be determined based on a three-dimensional distribution of the variation speed for the gradient in the frequency axis direction and the gradient in the time axis direction.

Furthermore, in the above-mentioned explanations, the correction is described to change the upper limit or the lower limit of the numerical range of the propagation path state for the modulation parameter, but a correction can be made to factors other than the thresholds. In other words, instead of making a correction to change the upper limit or the lower limit of the numerical range of the propagation path state for the modulation parameter, the same effects are obtained by correcting the estimation result of the propagation path state or the selected modulation parameter. Two correction examples will be described below in correcting factors other than the thresholds.

Correction Example 1

Case of Correcting the Estimation Result of the Propagation Path State

In the above-mentioned first to fifth embodiments, only the operations of the correcting circuit and modulation parameter selecting circuit are different from one another, and the operations of the other structural elements are the same. In the case of correcting the estimation result of the propagation path state, the direction of the correction is opposite to that in the case of the correction to change the upper limit and lower limit of the numerical range of the propagation path state. For example, the estimation result of the propagation path state is corrected to shift in the direction of a poorer propagation path state, as the absolute value of the gradient in the frequency axis direction is higher. The modulation parameter selecting circuit selects a modulation parameter using a predetermined relational equation or table, based on the estimation result of the propagation path state corrected in the correcting circuit.

Correction Example 2

Case of Correcting the Selected Modulation Parameter

In the above-mentioned first to fifth embodiments, only the operations of the correcting circuit and modulation parameter selecting circuit are different from one another, and the operations of the other structural elements are the same. In the case of correcting the selected modulation parameter, the direction of the correction is opposite to that in the case of the correction to change the upper limit and lower limit of the numerical range of the propagation path state. For example, the selected modulation parameter is corrected to shift to a modulation parameter with a lower error rate i.e. lower transmission rate, as the absolute value of the gradient in the frequency axis direction is higher. The correcting circuit generates a correction signal of the selected modulation parameter from the gradient in the frequency axis direction, as described in the above-mentioned first to third embodiments. The modulation parameter selecting circuit selects a modulation parameter using the estimation result of the propagation path state and a predetermined relational equation or table, and further, corrects the selected modulation parameter based on the modulation parameter correction signal from the correcting circuit.

In addition, in the case of correcting a threshold in the boundary of CNR in one-to-one correspondence with each modulation parameter, the correction widths may be not the same.

Further, estimation and correction of the propagation path state, and selection of the modulation parameter may be performed by a receiver estimating and correcting the propagation path state to transmit the results to a transmitter, so that the transmitter performs modulation parameter selection. Otherwise, a receiver may estimate the propagation path state and transmit the result to a transmitter, so that the transmitter makes a correction and modulation parameter selection. Further, a receiver may perform estimation and correction of the propagation path state and modulation parameter selection and transmit the results to a transmitter. Furthermore, a receiver transmits information required for estimation of the propagation path state to a transmitter, so that the transmitter performs estimation and correction of the propagation path state and modulation parameter selection.

FIG. 27 is a block diagram illustrating an example where the adaptive modulation control apparatus as described above is applied to a wireless communication apparatus. This wireless communication apparatus 270 performs transmission and reception of radio signals in a transmitting/receiving section 271. An adaptive modulation control apparatus 272 is any one of the adaptive modulation control apparatuses in the above-mentioned embodiments. The transmitting/receiving section 271 receives the propagation path estimation information indicative of the estimation result of the propagation path state from a communicating party, and the adaptive modulation control apparatus 272 is thereby capable of selecting a modulation parameter. In addition, the wireless communication apparatus 270 may be provided with a propagation path estimating section 273 that estimates the state of the propagation path based on the propagation path measurement information indicative of a result of measurement of the propagation path state received in the transmitting/receiving section 271 from a communicating party. In this case, by the transmitting/receiving section 271 receiving the propagation path measurement information from the communicating party, it is possible to estimate the state of the propagation path, and based on the estimation result of the propagation path, select a modulation parameter.

In addition, as the embodiments, multicarrier communication is described as an example. In single-carrier communication, for example, by estimating a propagation path state in a frequency band adjacent to the frequency band used in target single-carrier communication, or estimating a variation of the propagation path state in the frequency band used in the target single-carrier communication, it is possible to obtain the gradient in the frequency axis direction of the propagation path state by the same method as in multicarrier communication. By this means, the present invention is also applicable to single-carrier communication.

BRIEF DESCRIPTION OF SYMBOLS

Figure 1:
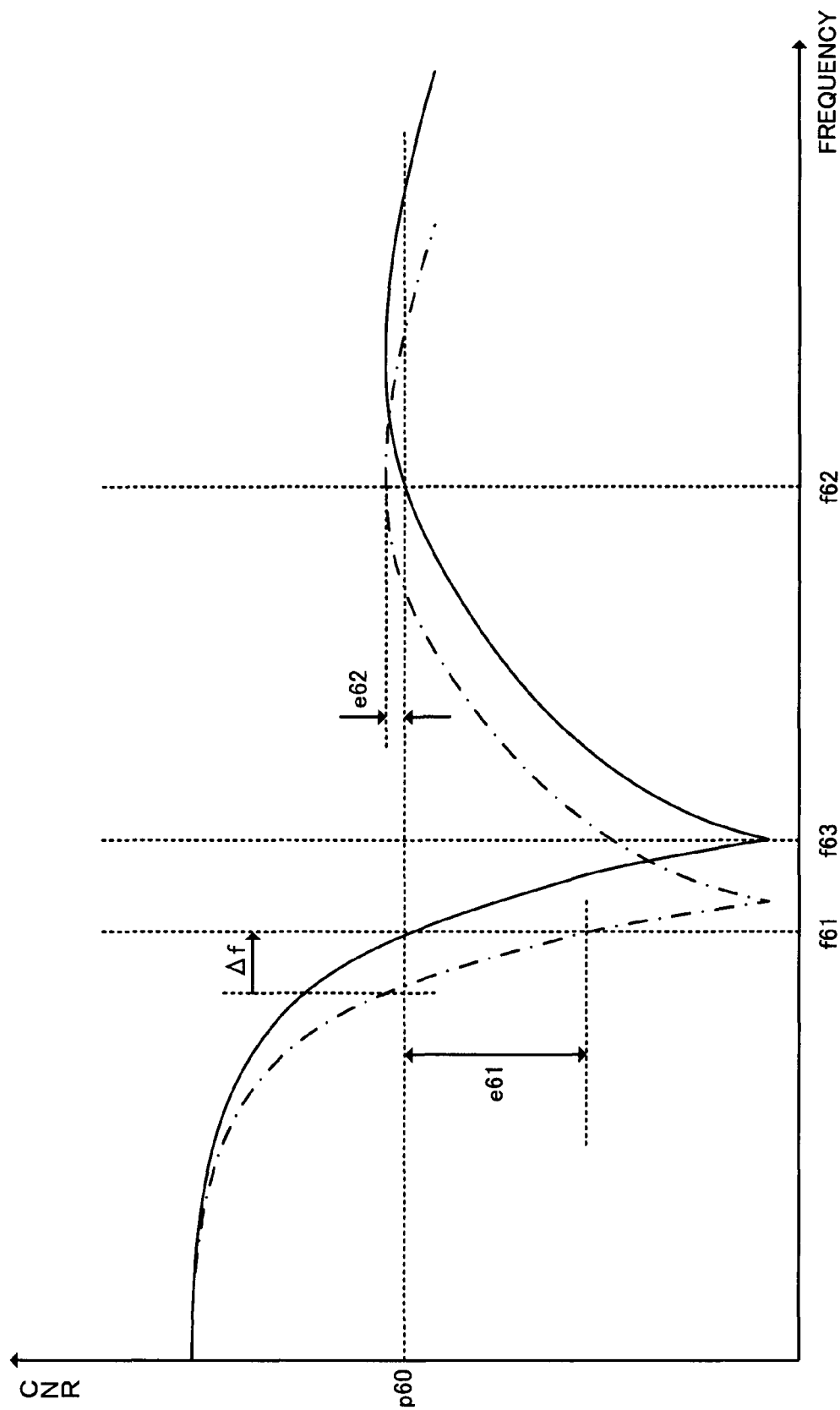
FIG. 1 is a graph showing a case where an error shifting in the frequency axis direction occurs in an estimation result of a propagation path state.
Figure 2:
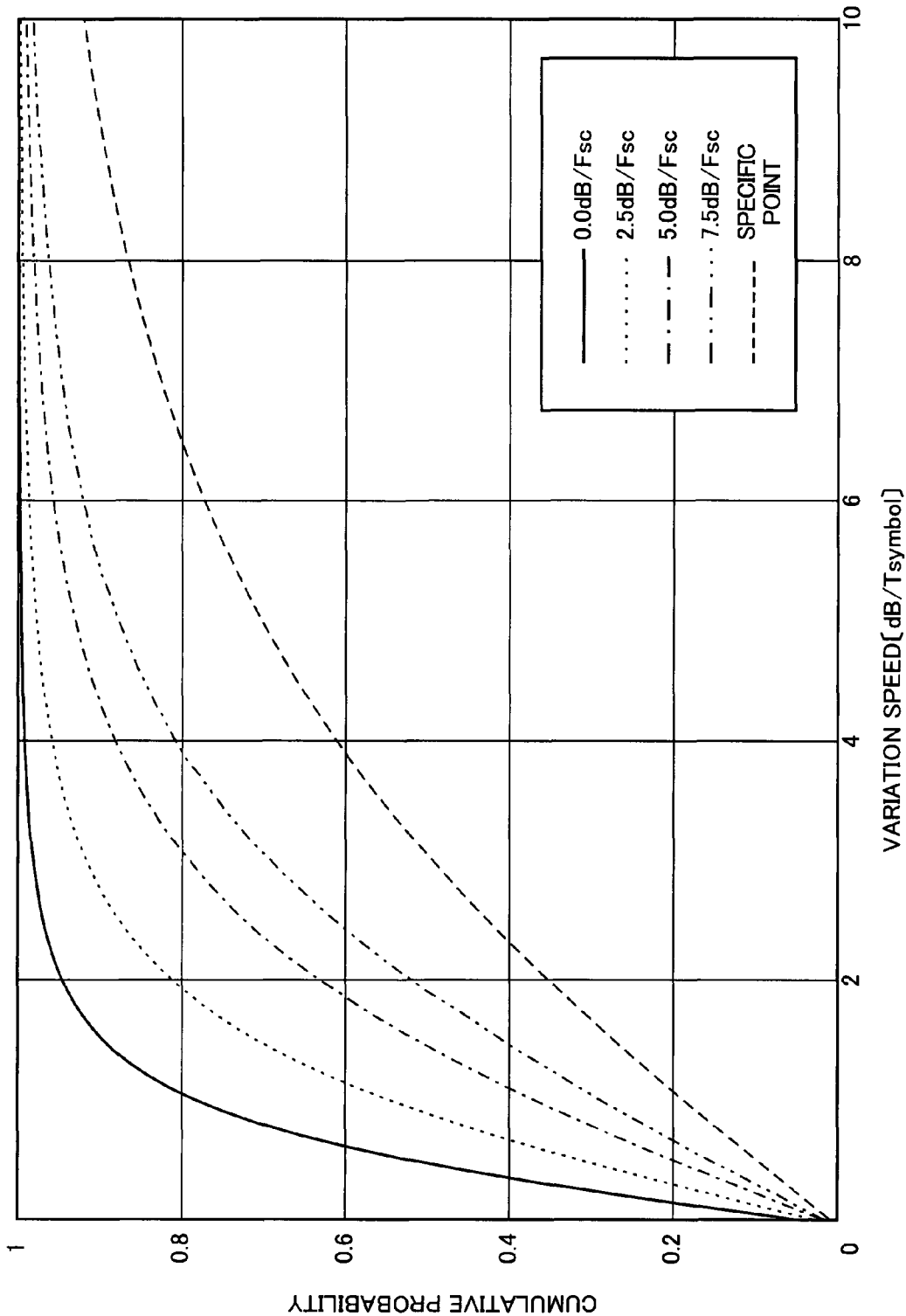
FIG. 2 is a graph showing results, obtained by numerical simulations of an OFDM communication system, of the relationship between the gradient in the frequency axis direction of the propagation path state and the variation speed of the propagation path state in an example of multipath Rayleigh fading propagation path.
Figure 3:
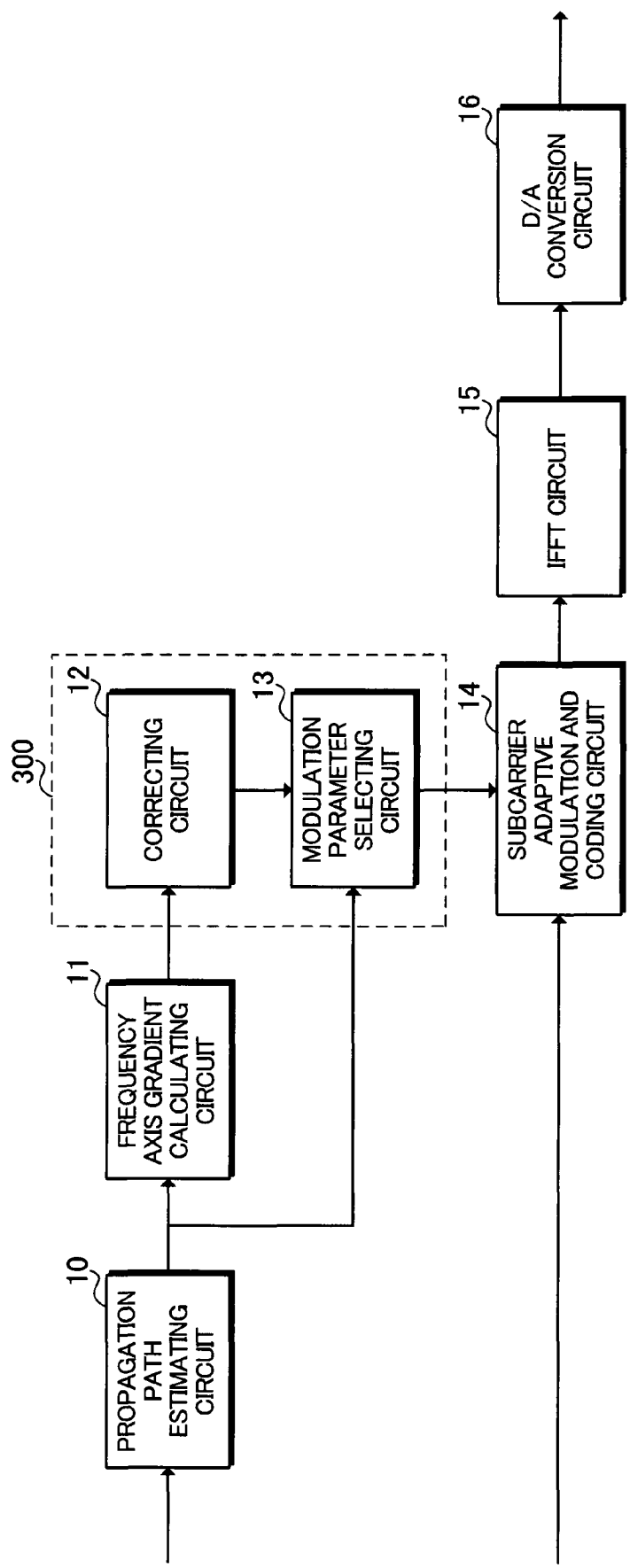
FIG. 3 is a block diagram illustrating a schematic configuration of an adaptive modulation control apparatus according to the first embodiment of the invention.
Figure 4:
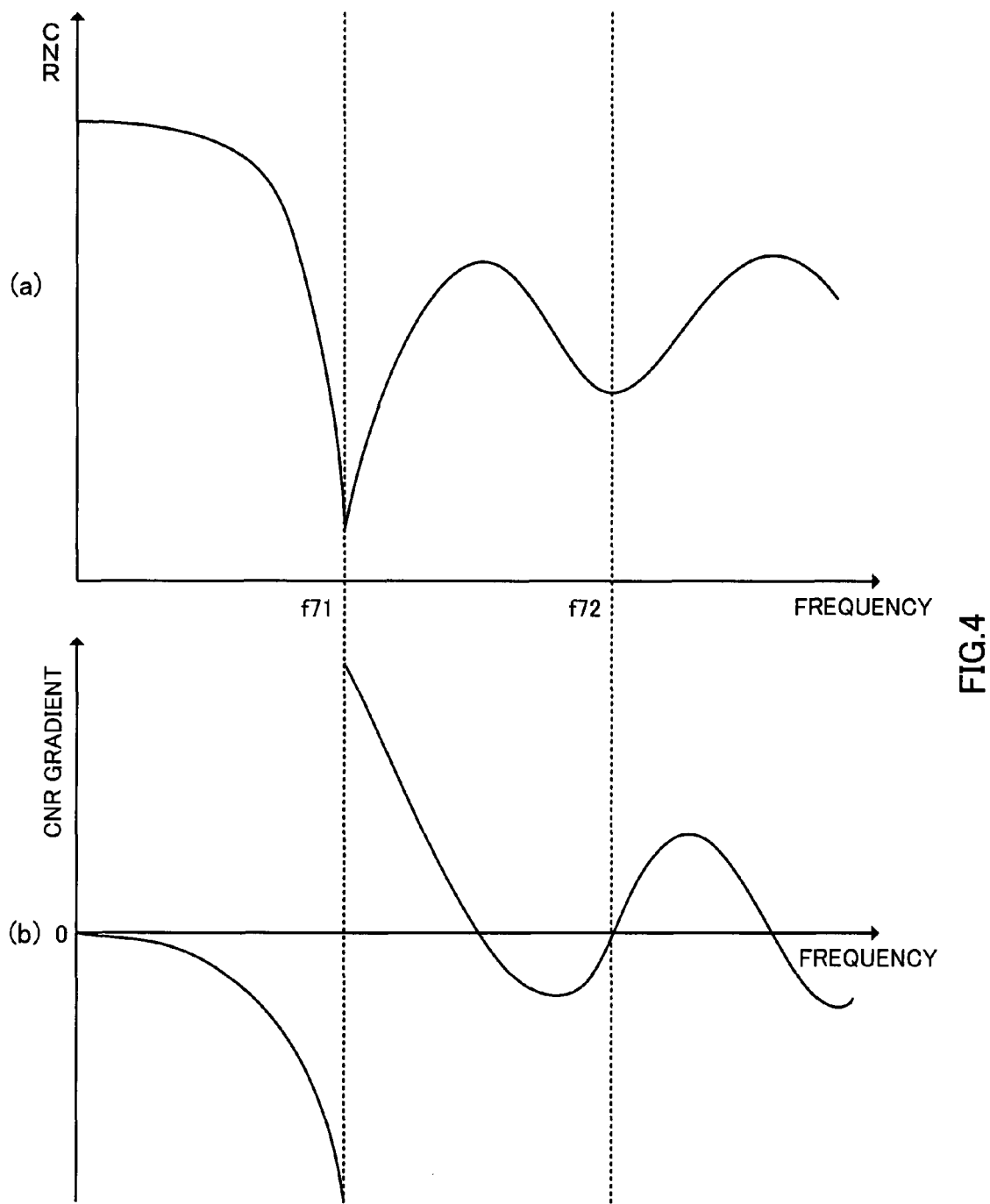
FIG. 4(a) is a graph showing CNR as a function of frequency.
FIG. 4(b) is a graph showing the gradient of CNR for frequency as a function of frequency.
Figure 5:
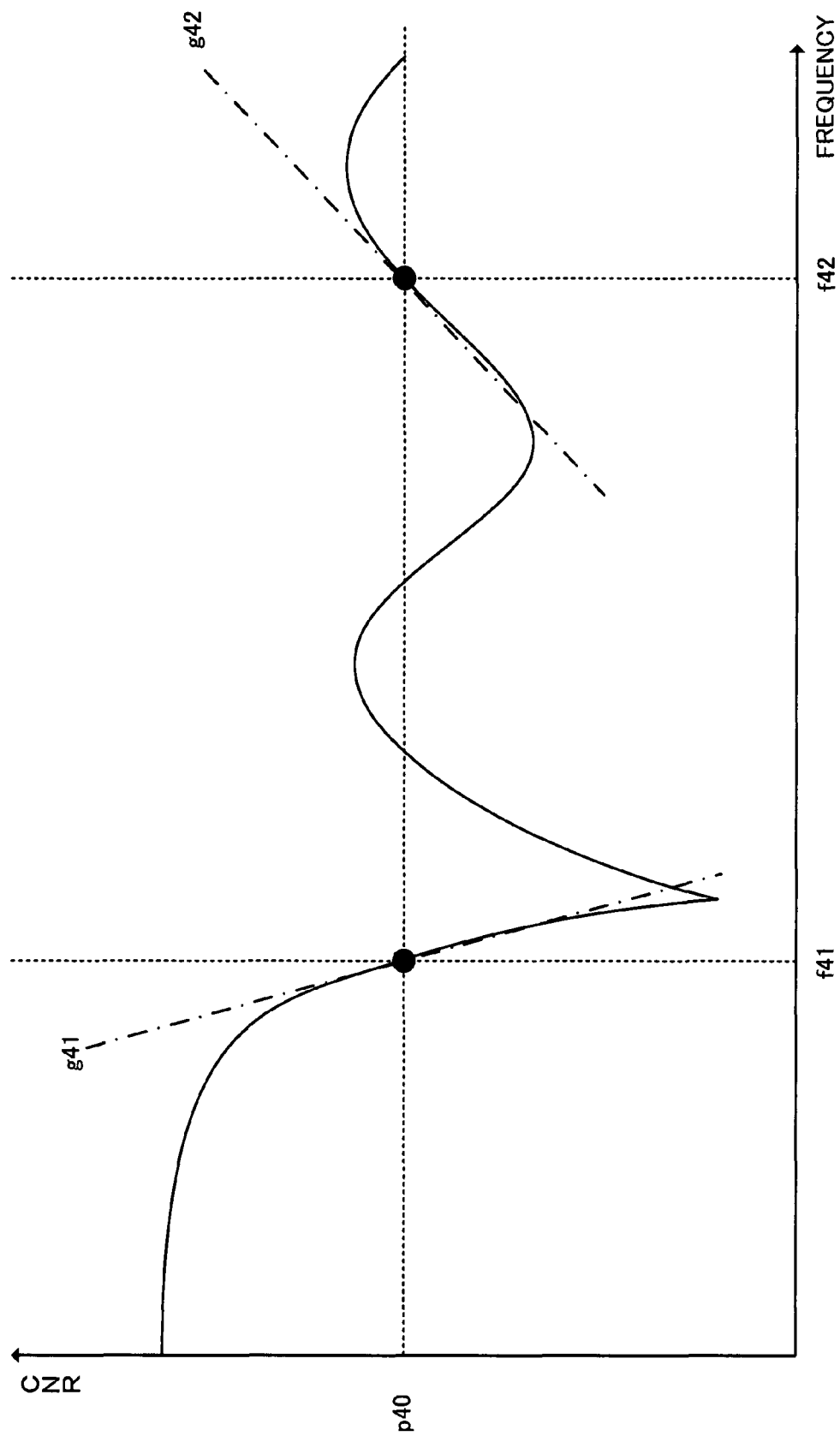
FIG. 5 is a graph showing an example of the estimation result of the propagation path state.
Figure 6:
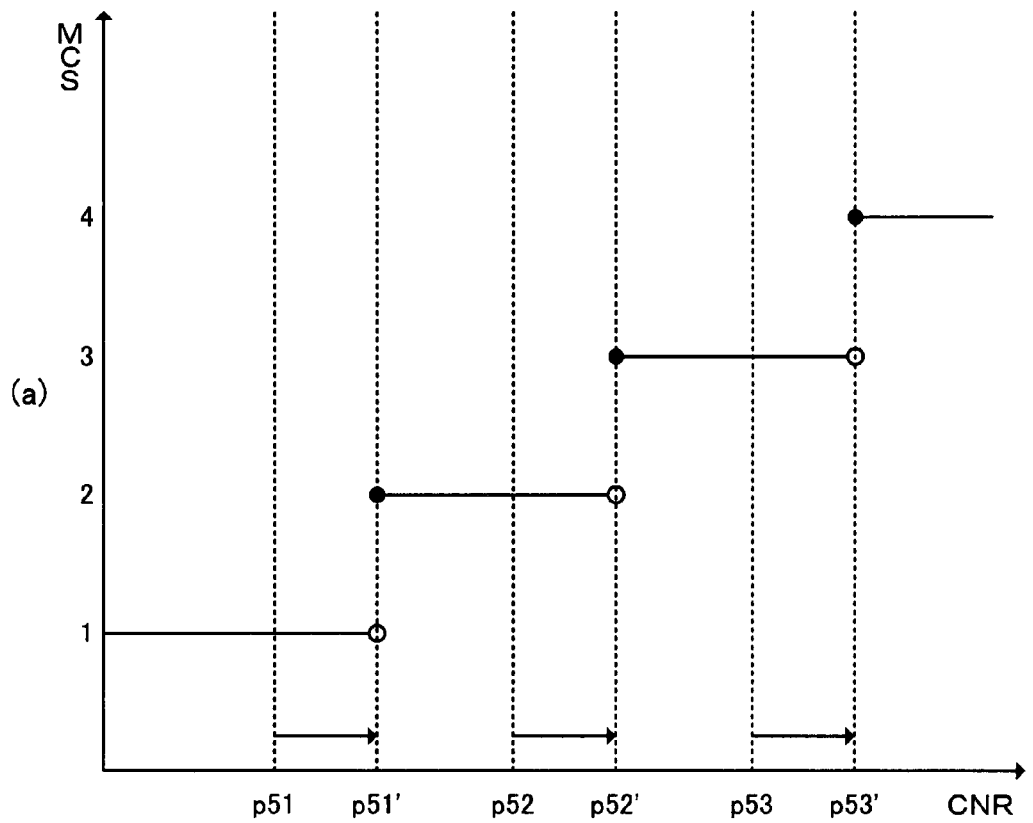
FIG. 6(a) is a graph showing corrections to the relationship between the propagation path state and modulation parameter (MCS) selection based on the estimation result of the propagation path state.
FIG. 6(b) is another graph showing corrections to the relationship between the propagation path state and modulation parameter (MCS) selection based on the estimation result of the propagation path state.
Figure 6:
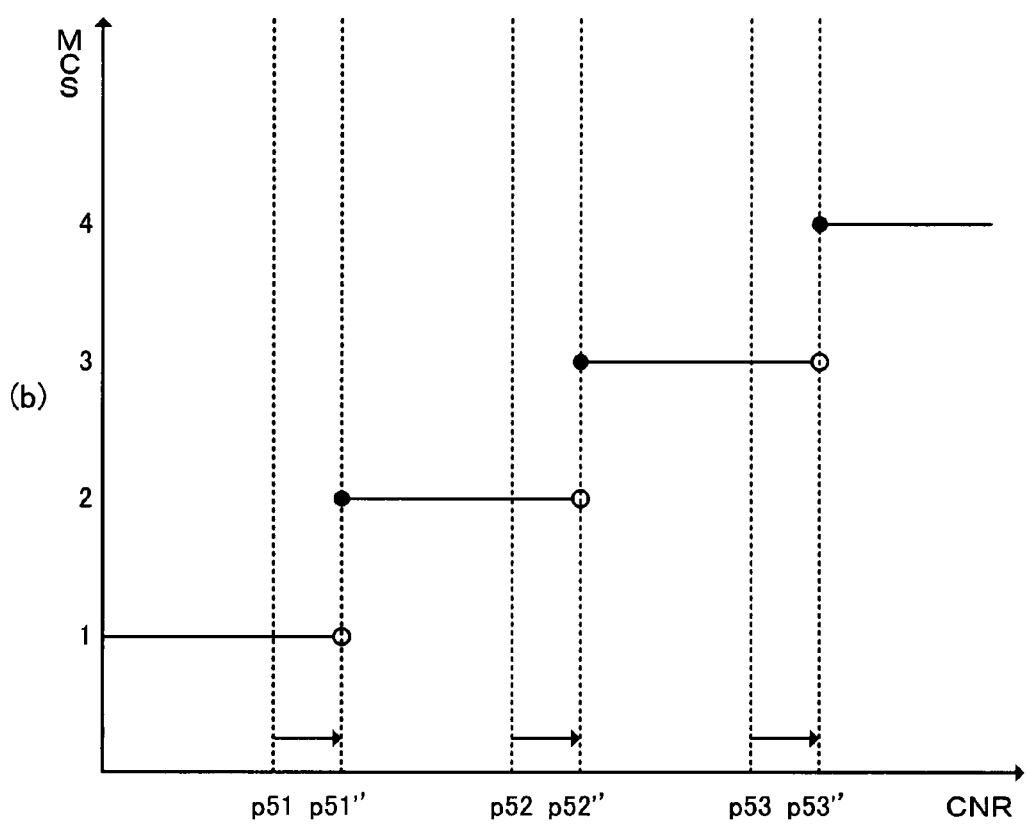
Figure 7:
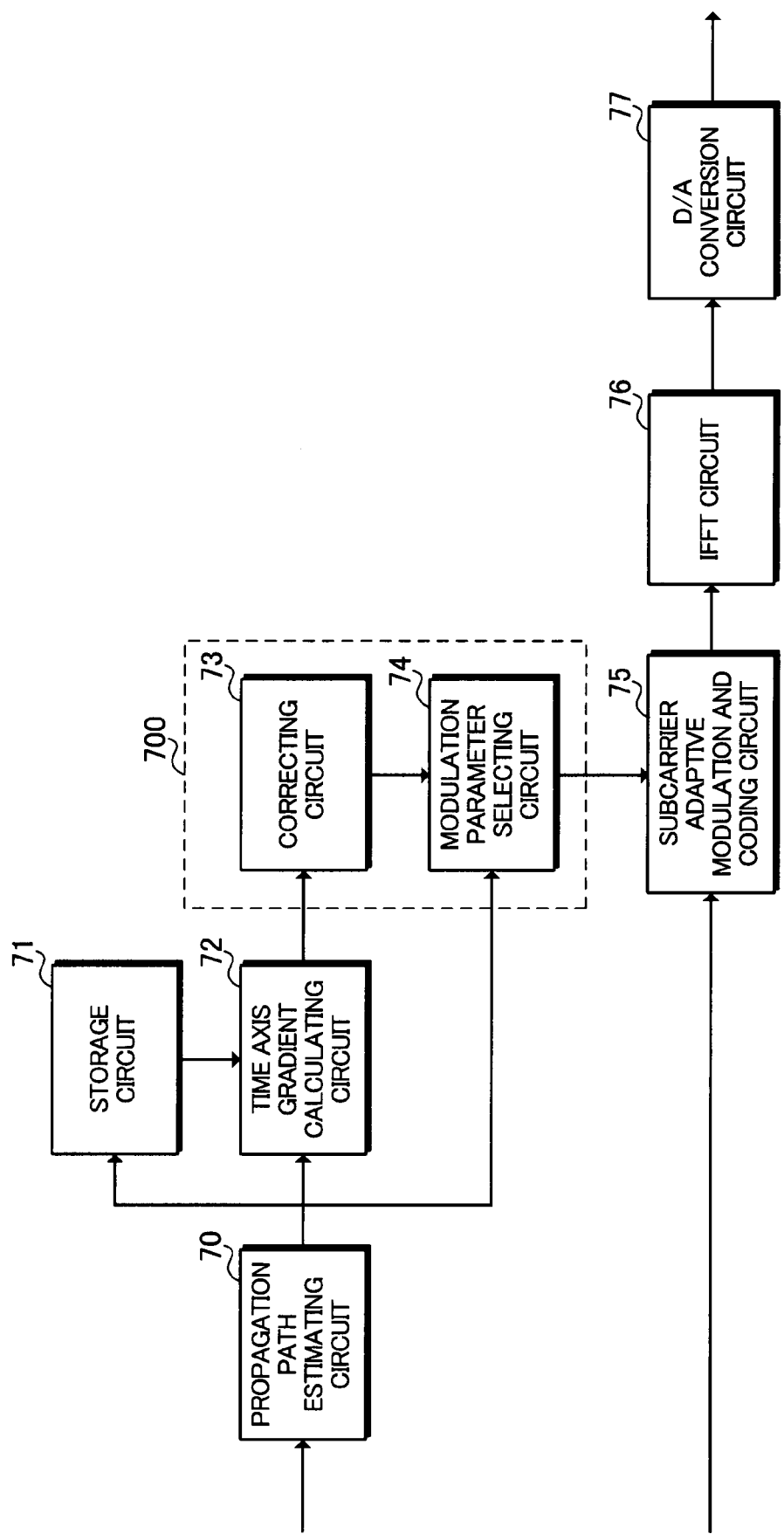
FIG. 7 is a block diagram illustrating a schematic configuration of an adaptive modulation control apparatus according to the second embodiment.
Figure 8:
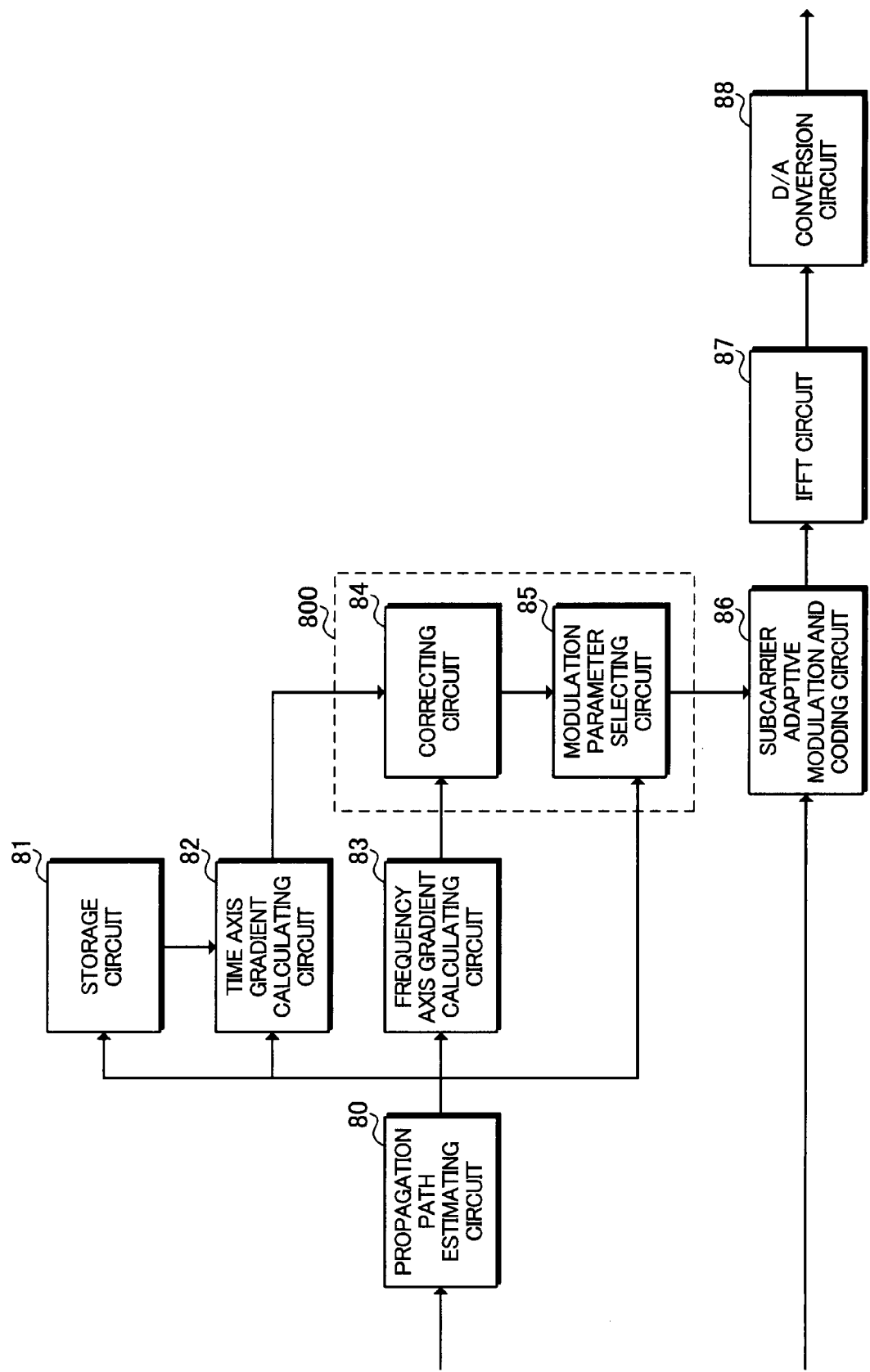
FIG. 8 is a block diagram illustrating a schematic configuration of an adaptive modulation control apparatus according to the third embodiment.
Figure 9:
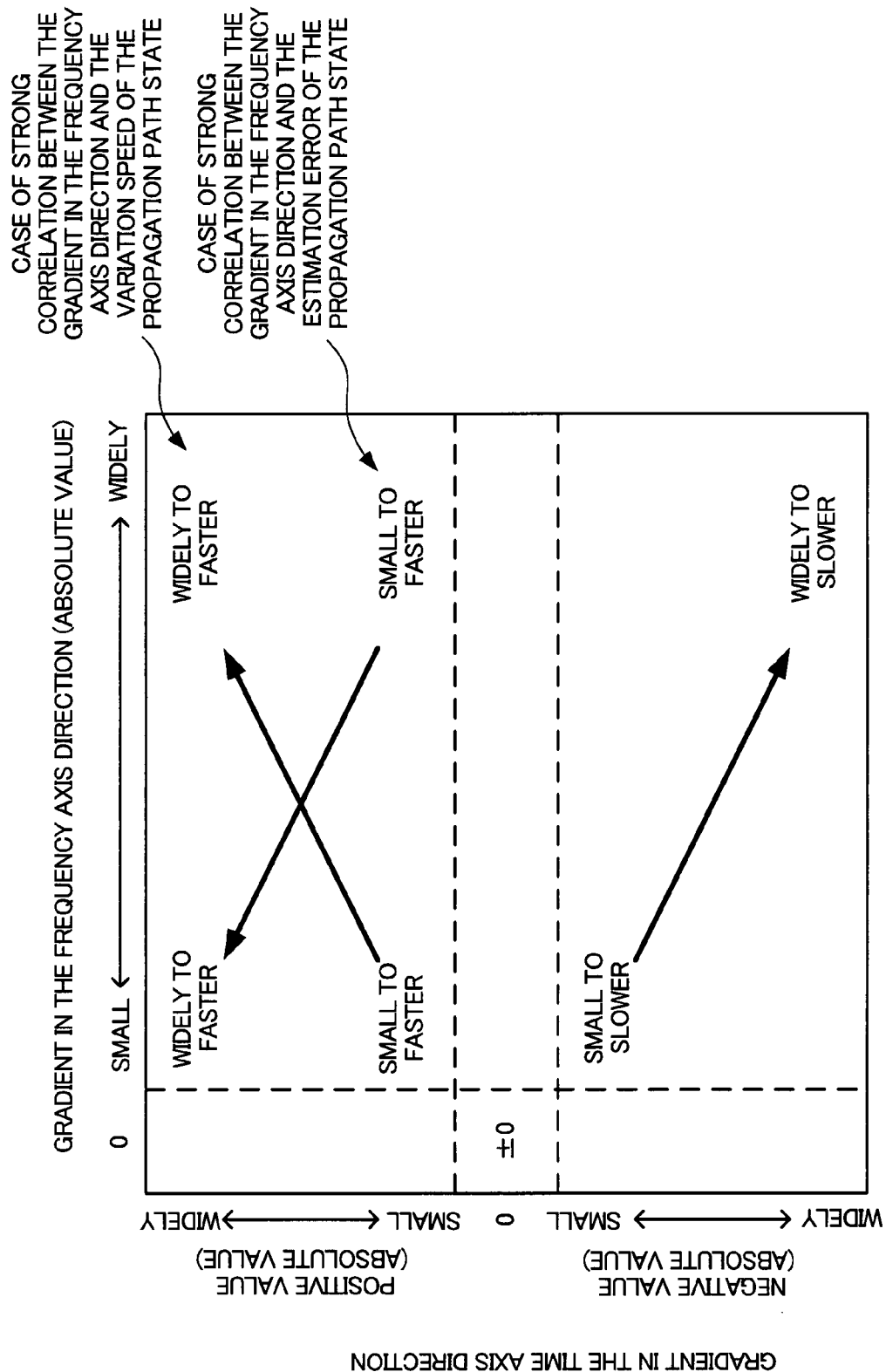
FIG. 9 is a diagram showing a method of determining a correction width corresponding to the gradient in the frequency axis direction and the gradient in the time axis direction.
Figure 10:
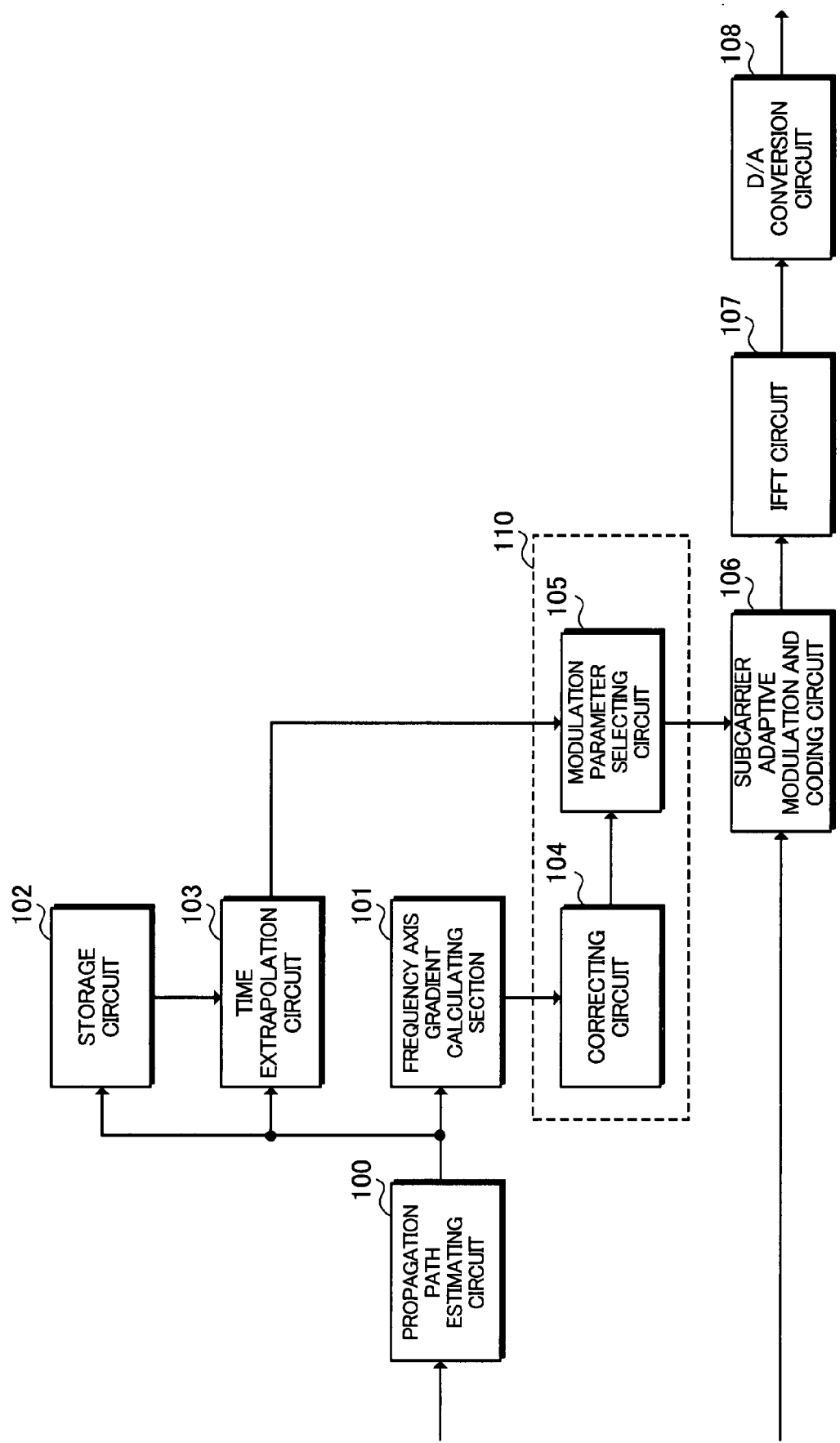
FIG. 10 is a block diagram illustrating a schematic configuration of an adaptive modulation control apparatus according to the fourth embodiment.
Figure 11:
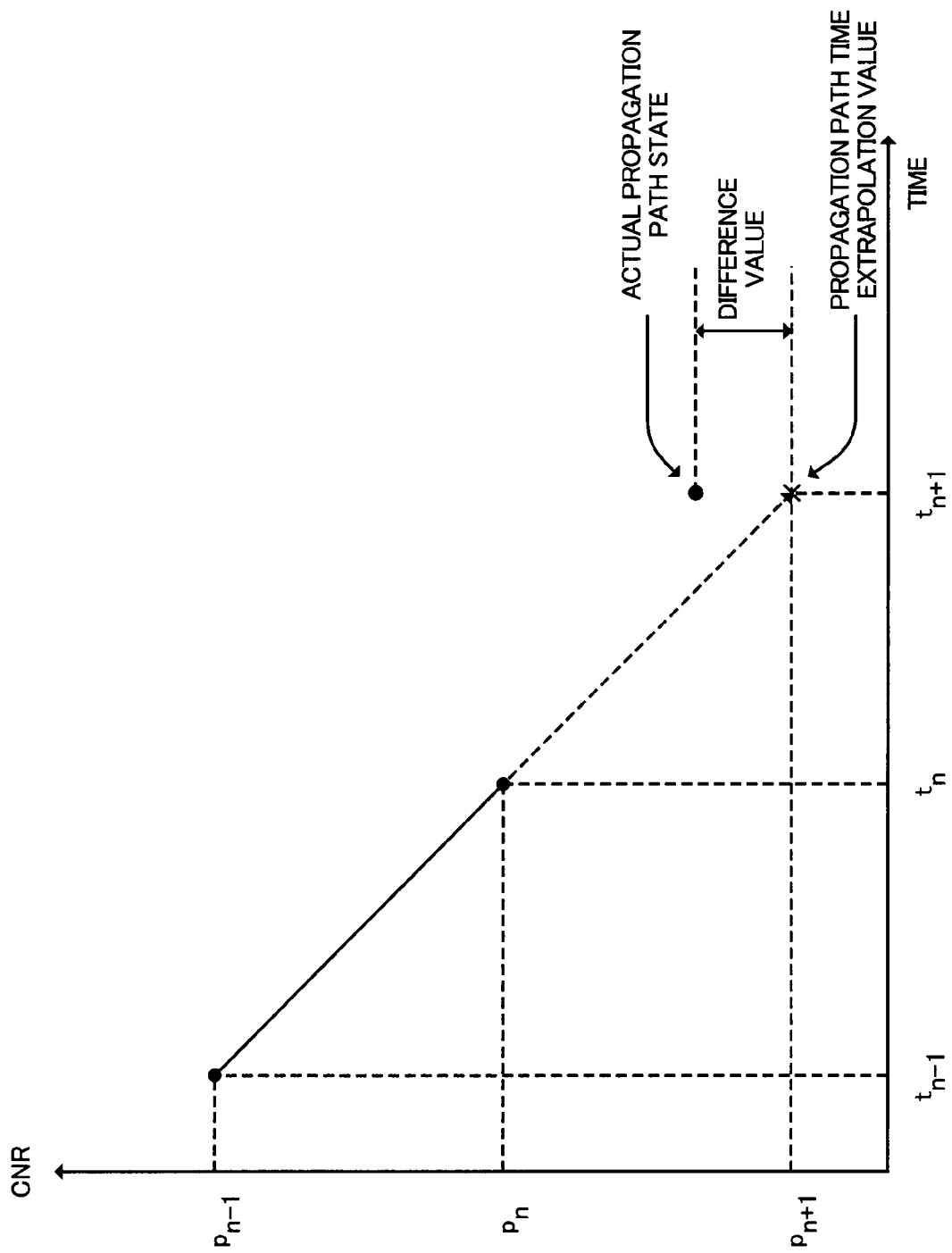
FIG. 11 is a graph showing a difference value between a propagation path time extrapolation value and a measurement result of the propagation path state at the target time of prediction by the extrapolation.
Figure 12:
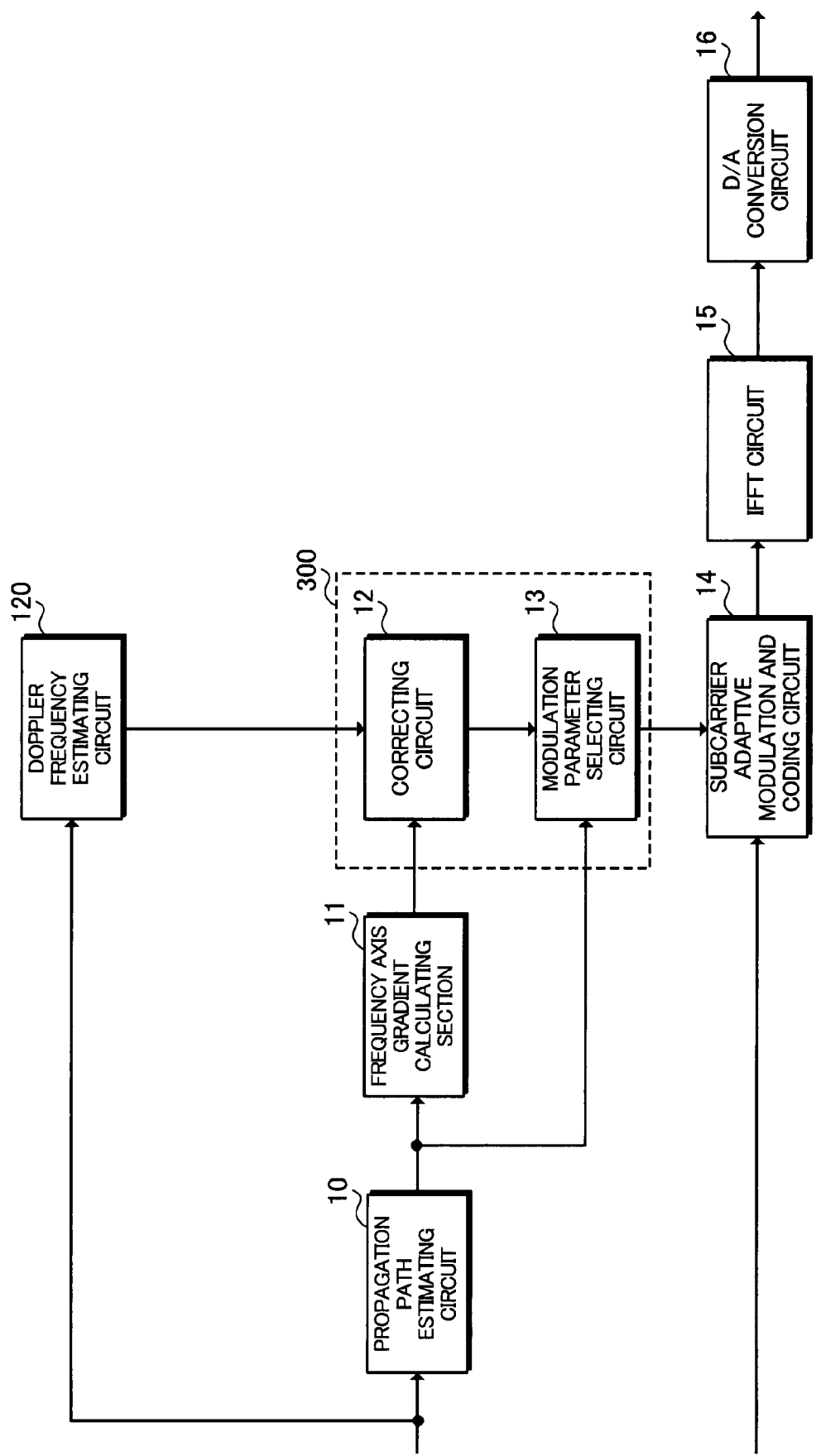
FIG. 12 is a diagram showing an example where a Doppler frequency estimating circuit is provided in the adaptive modulation control apparatus according to the first embodiment.
Figure 13:
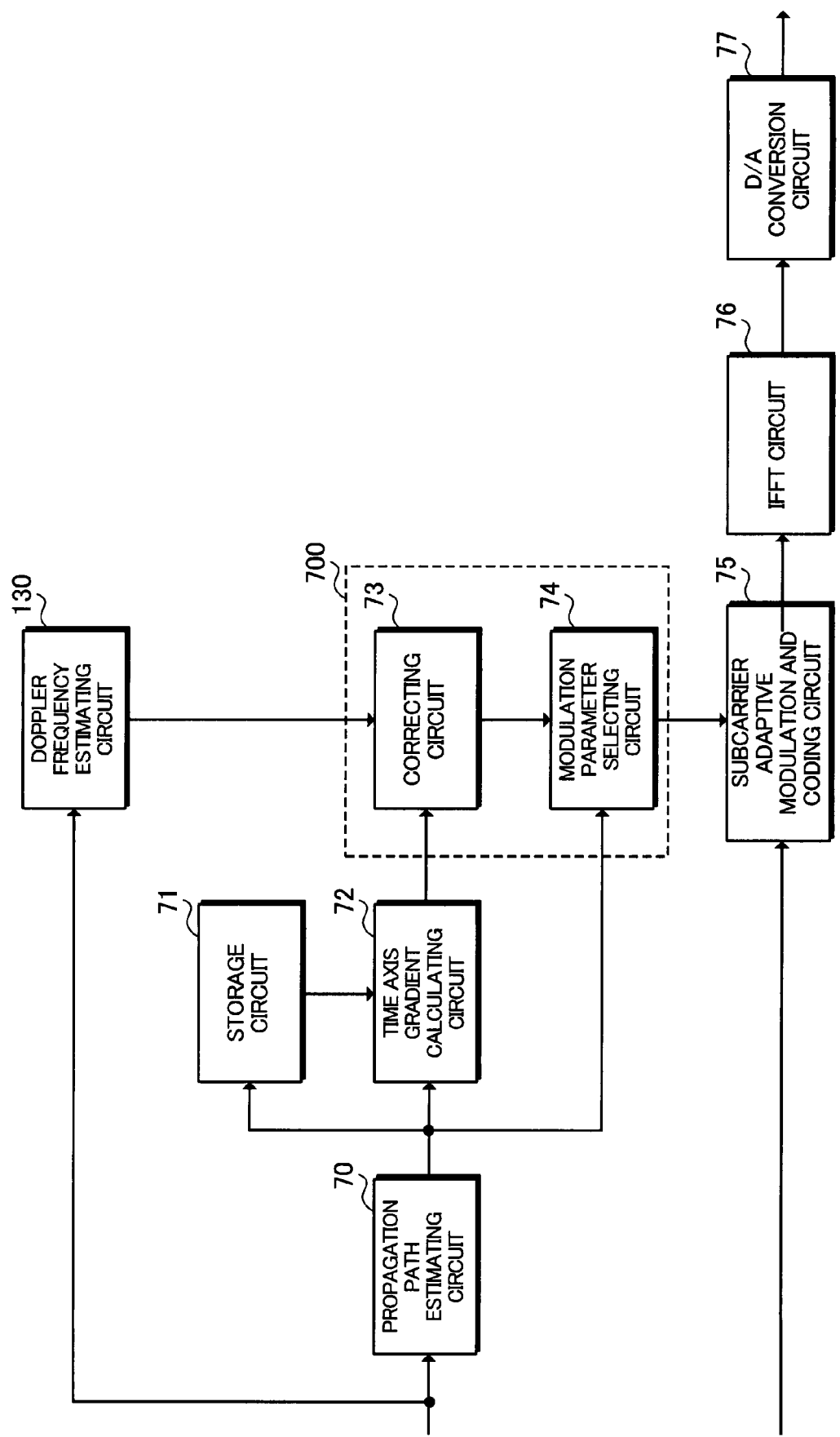
FIG. 13 is a diagram showing an example where a Doppler frequency estimating circuit is provided in the adaptive modulation control apparatus according to the second embodiment.
Figure 14:
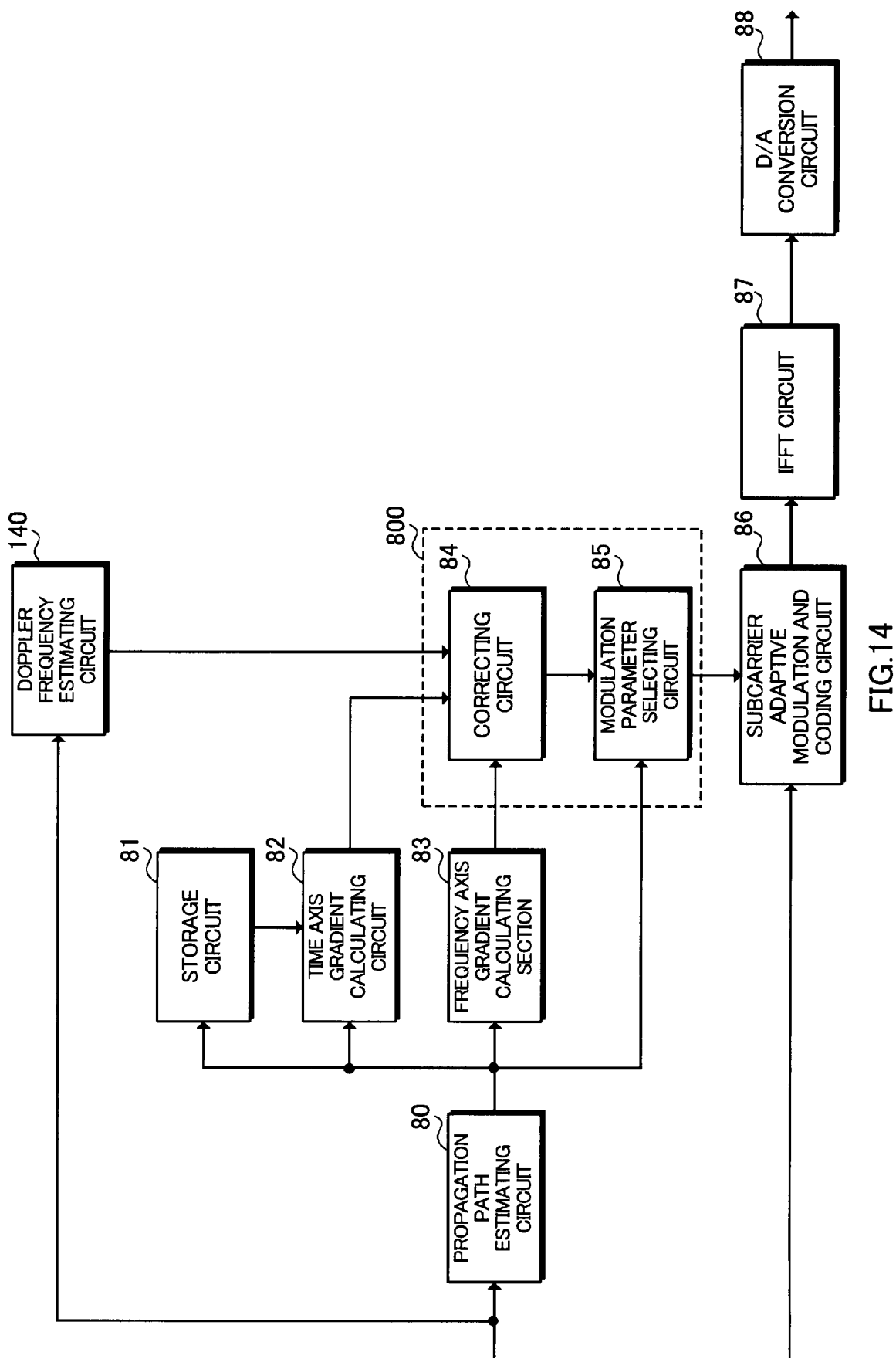
FIG. 14 is a diagram showing an example where a Doppler frequency estimating circuit is provided in the adaptive modulation control apparatus according to the third embodiment.
Figure 15:
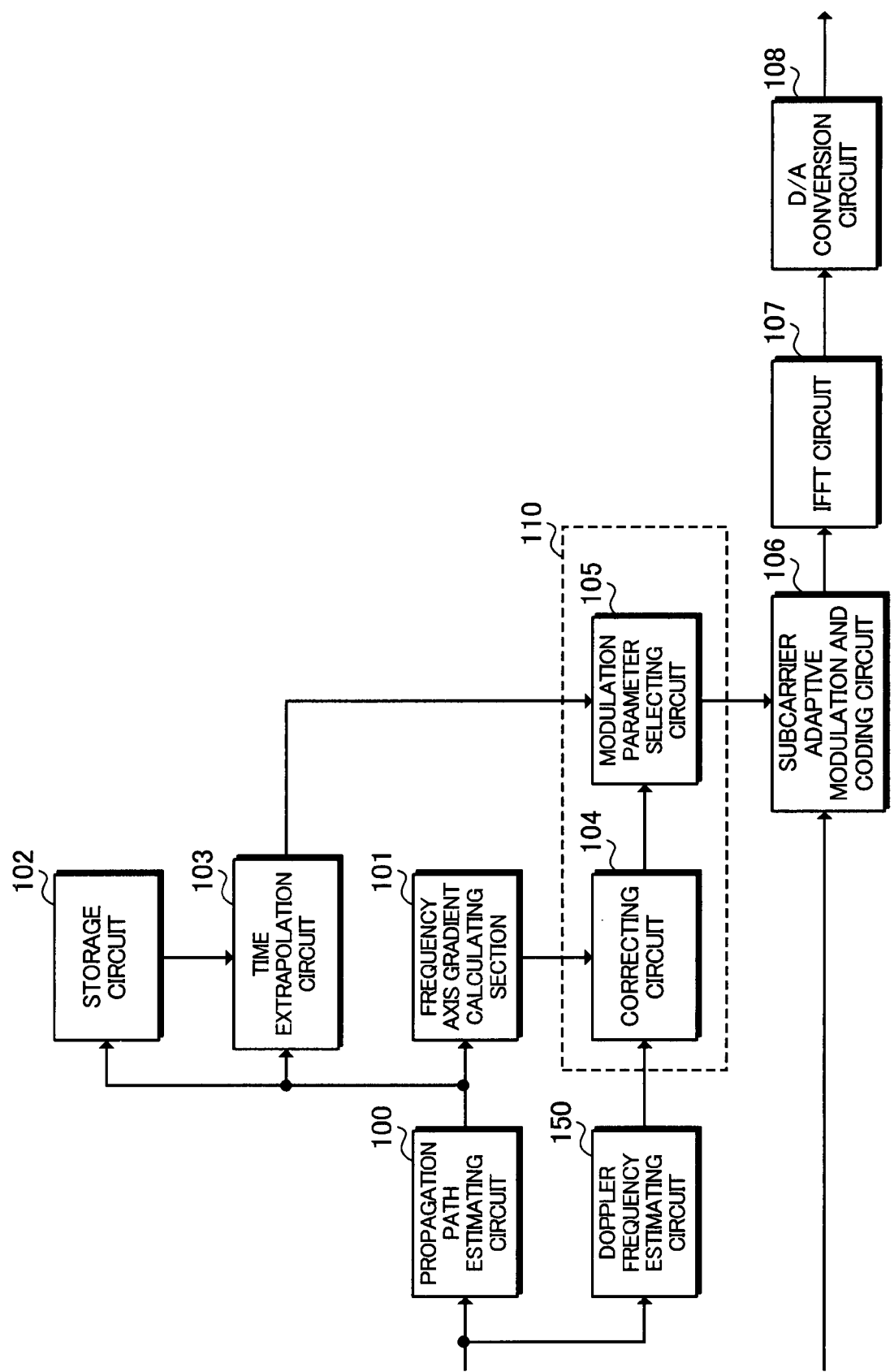
FIG. 15 is a diagram showing an example where a Doppler frequency estimating circuit is provided in the adaptive modulation control apparatus according to the fourth embodiment.
Figure 16:
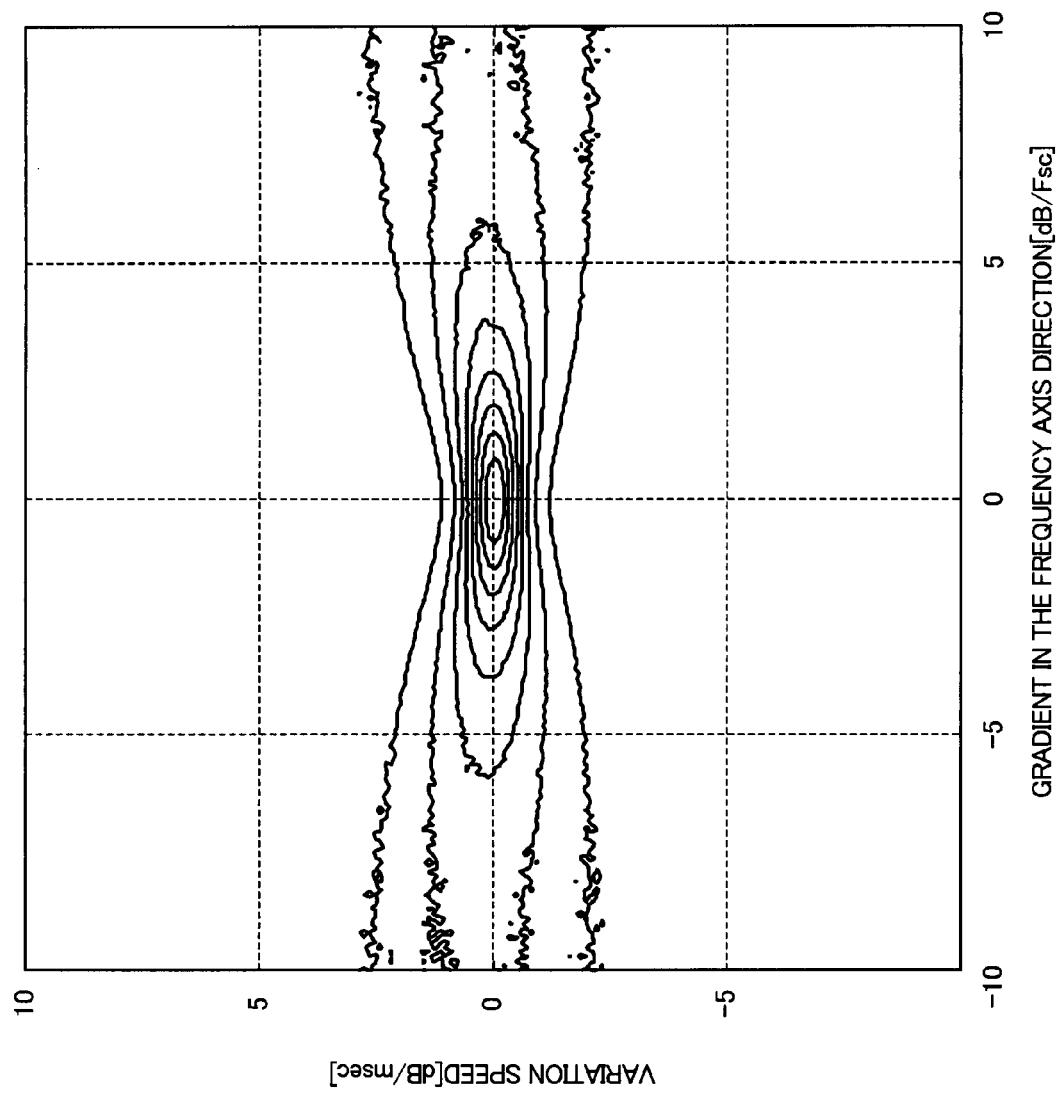
FIG. 16 is a graph showing results, obtained by computer simulations of the OFDM communication system, of the distribution of the variation speed of the propagation path state for the gradient in the frequency axis direction of the propagation path state at the Doppler frequency Fd of 20 Hz in an example of multipath Rayleigh fading propagation path.
Figure 17:
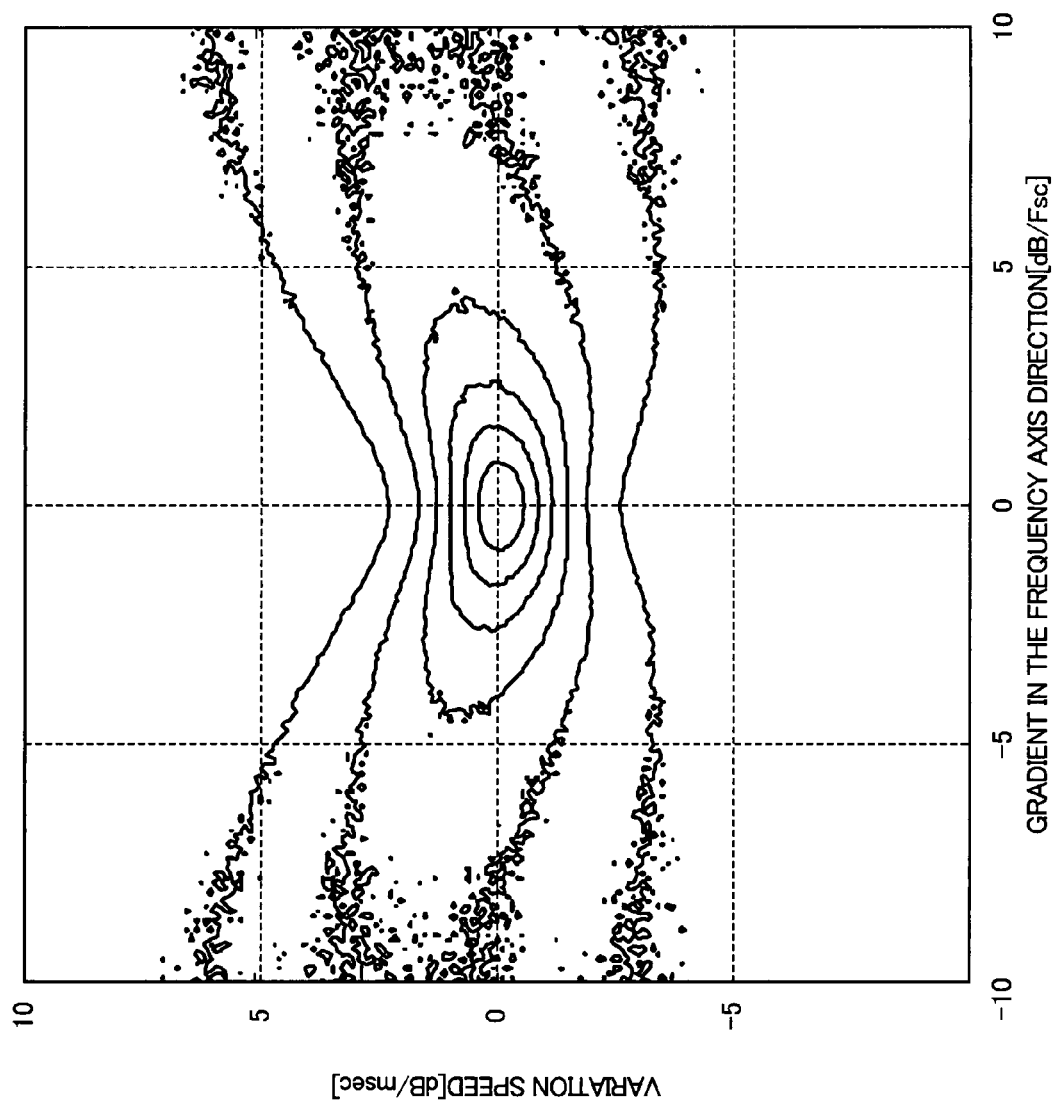
FIG. 17 is a graph showing results, obtained by computer simulations of the OFDM communication system, of the distribution of the variation speed of the propagation path state for the gradient in the frequency axis direction of the propagation path state at the Doppler frequency Fd of 50 Hz in an example of multipath Rayleigh fading propagation path.
Figure 18:
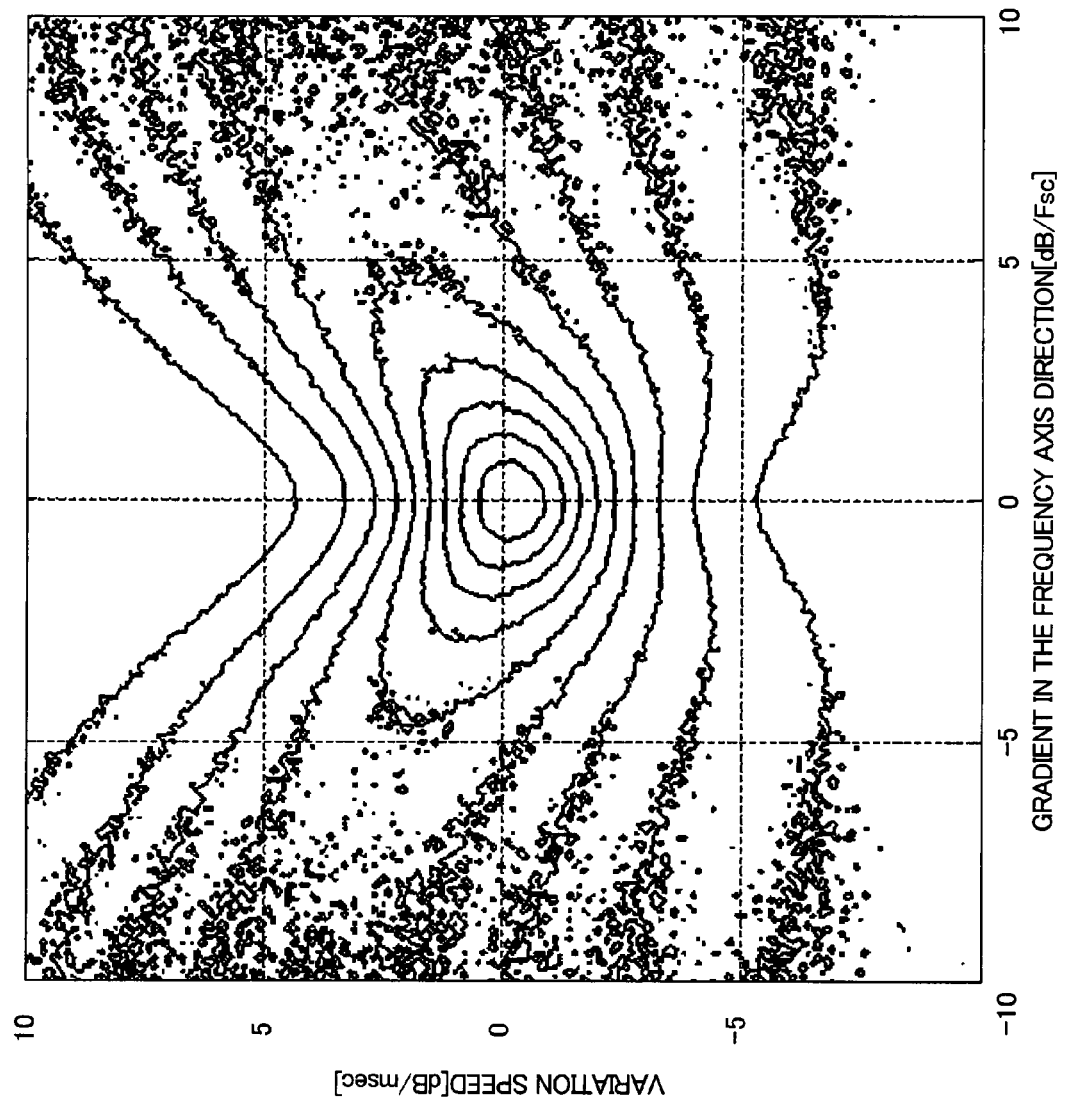
FIG. 18 is a graph showing results, obtained by computer simulations of the OFDM communication system, of the distribution of the variation speed of the propagation path state for the gradient in the frequency axis direction of the propagation path state at the Doppler frequency Fd of 100 Hz in an example of multipath Rayleigh fading propagation path.
Figure 19:
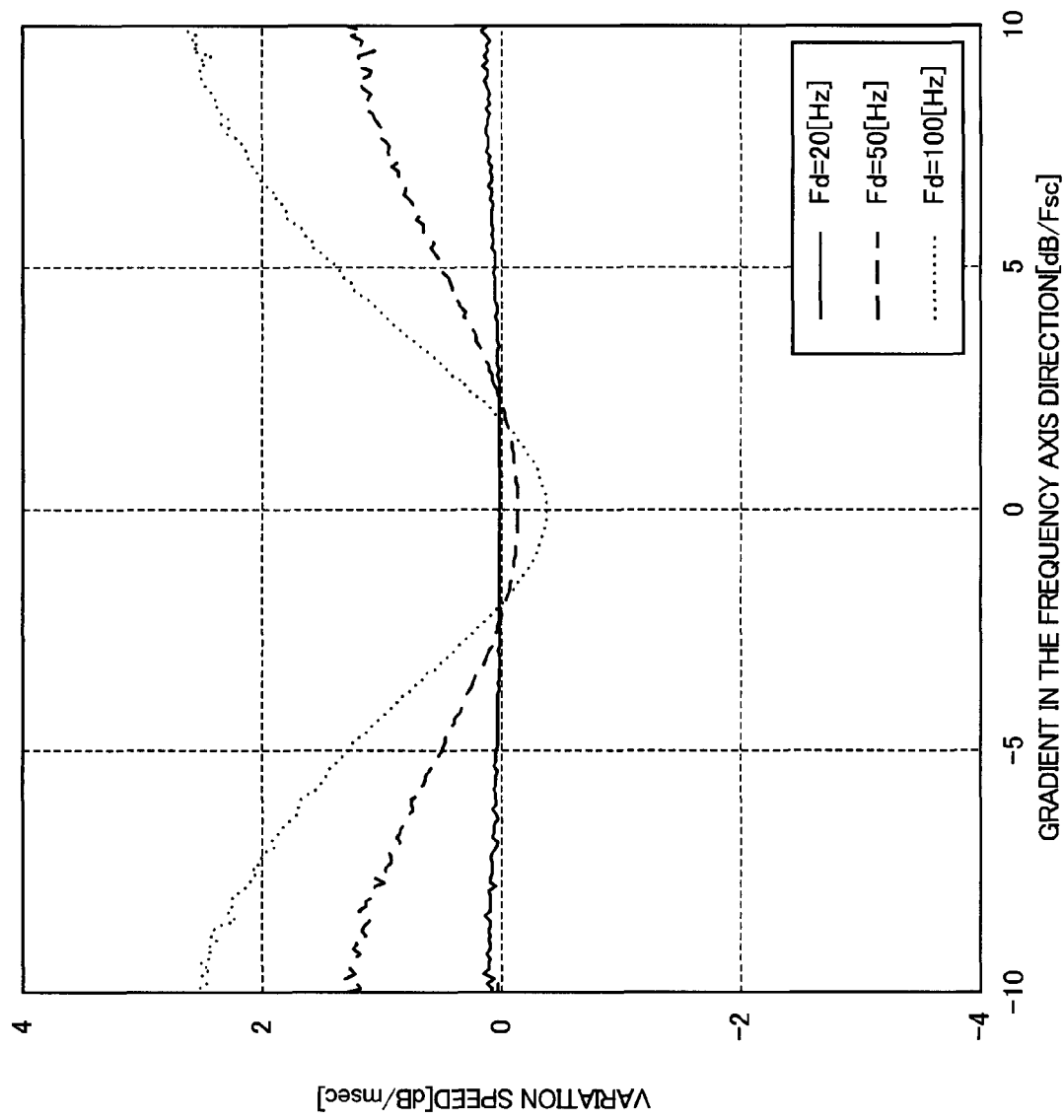
FIG. 19 is a graph showing results, obtained by computer simulations, of the average value in each gradient in the frequency axis direction of the variation speed distribution at the Doppler frequency Fd of 20 Hz, 50 Hz or 100 Hz.
Figure 20:
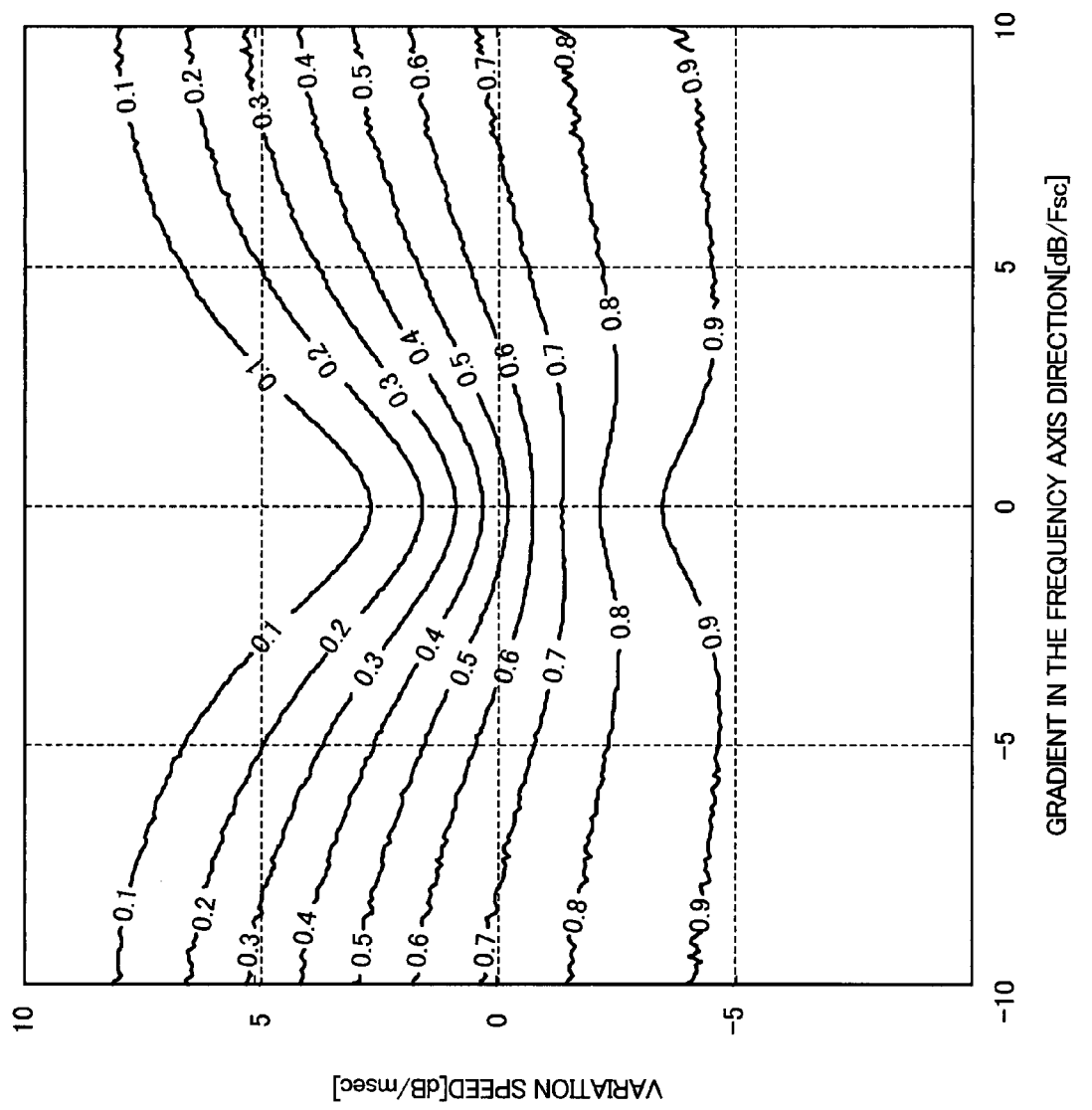
FIG. 20 is a graph showing results, obtained by computer simulations, of the distribution of the cumulative probability (hereinafter, simply referred to as the cumulative probability of the variation speed) from the maximum value of the variation speed (positive value) in the direction in which the propagation path state is improved in the variation speed distribution at the Doppler frequency Fd of 100 Hz.
Figure 21:
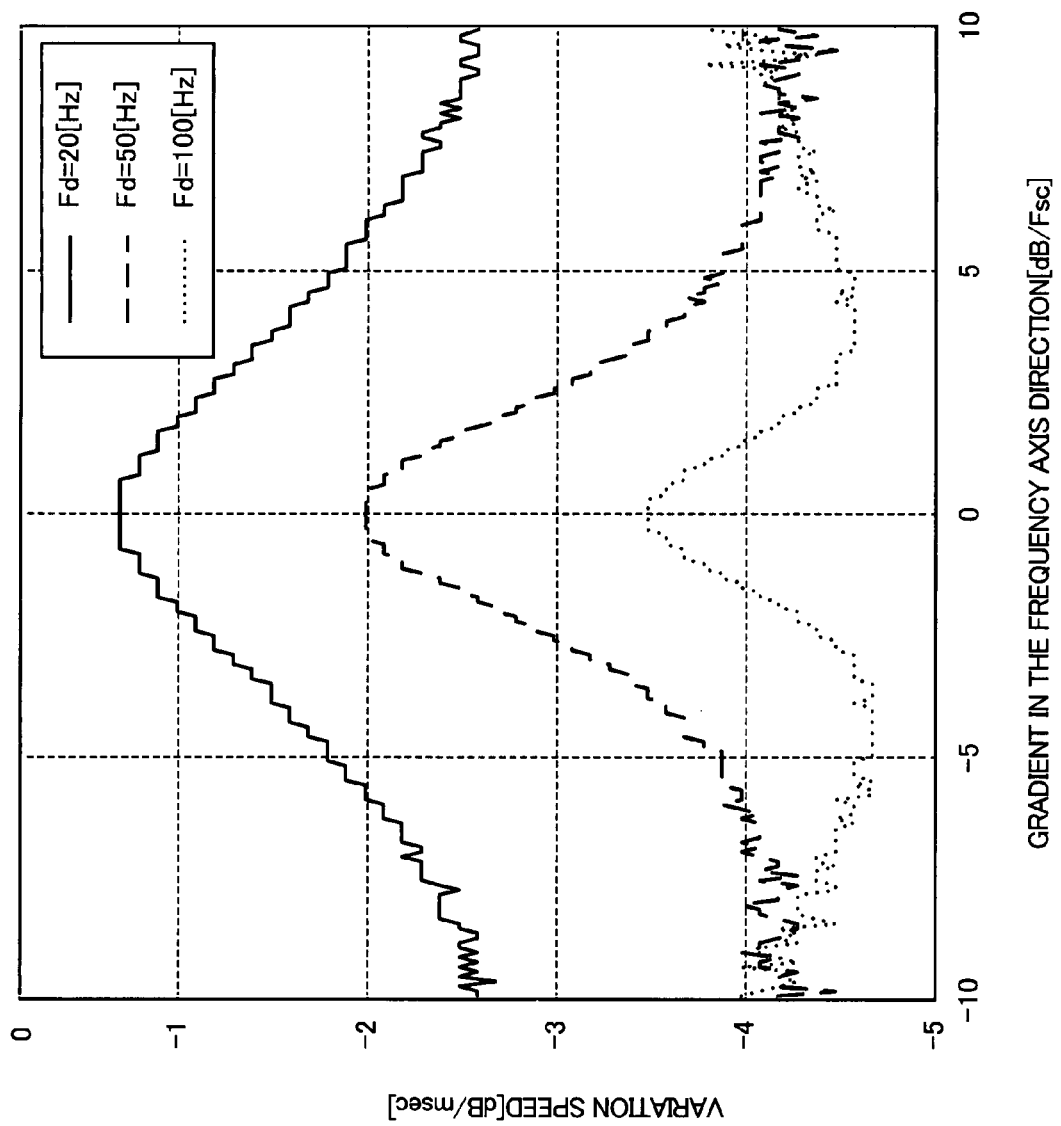
FIG. 21 is a graph showing results, obtained by computer simulations, of the variation speed such that the cumulative probability is 90% at the Doppler frequency Fd of 20 Hz, 50 Hz or 100 Hz.
Figure 22:
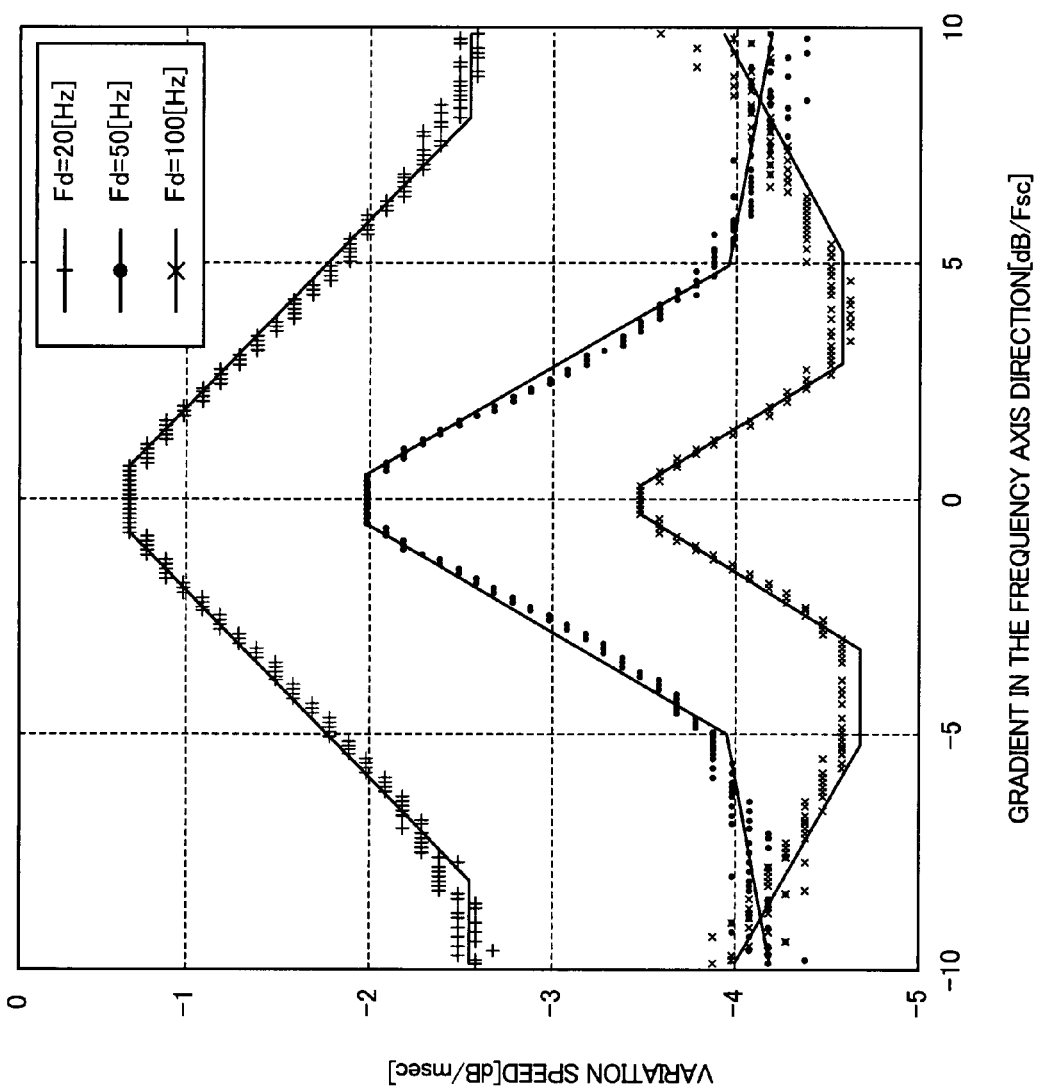
FIG. 22 is a graph showing an example where the results of FIG. 21 are approximated using a plurality of straight lines.
Figure 23:
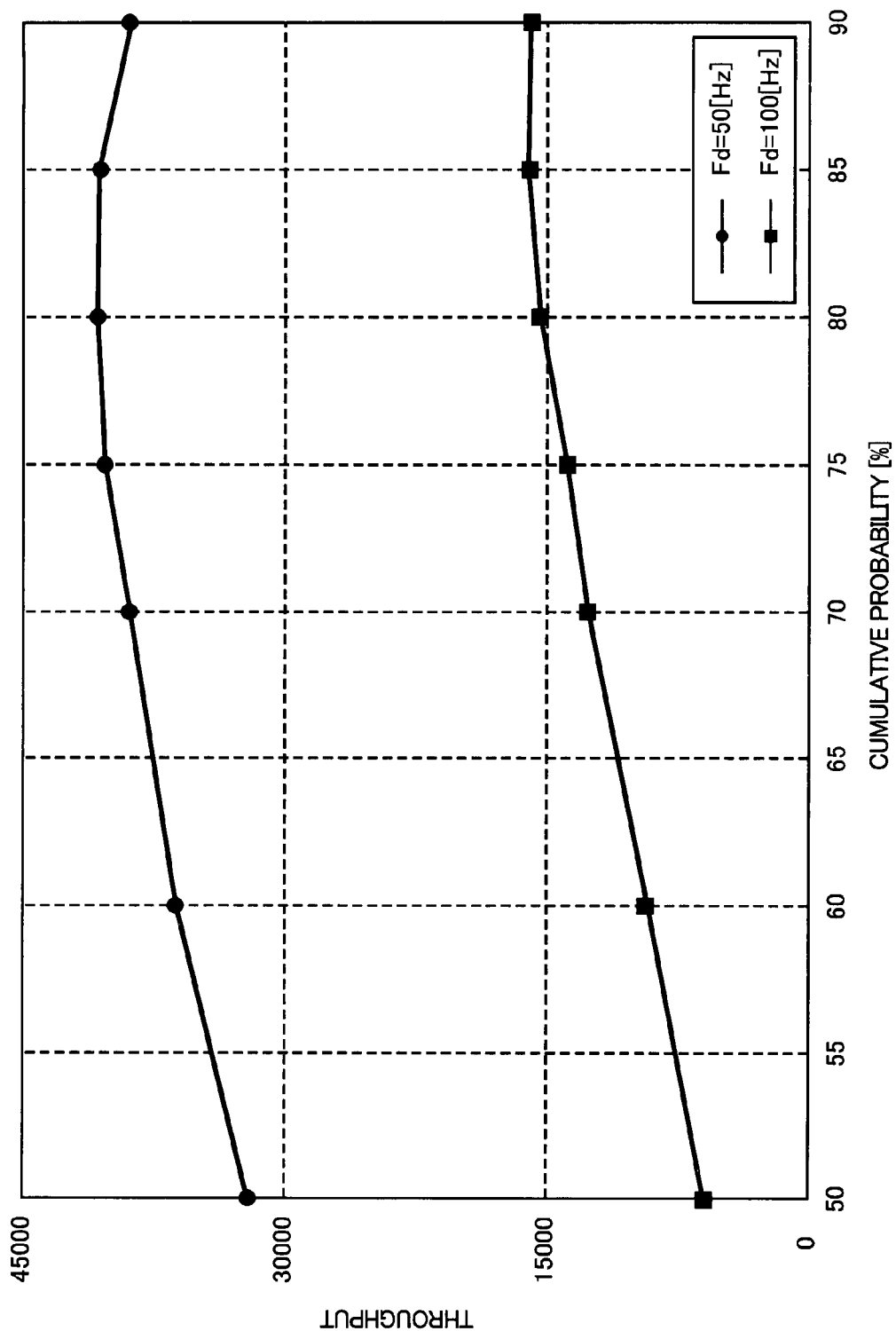
FIG. 23 is a graph showing an example of results, obtained by computer simulations, of characteristics of throughput for the cumulative probability of the variation speed as a criterion in determining the correction width at the Doppler frequency Fd of 50 Hz or 100 Hz.
Figure 24:
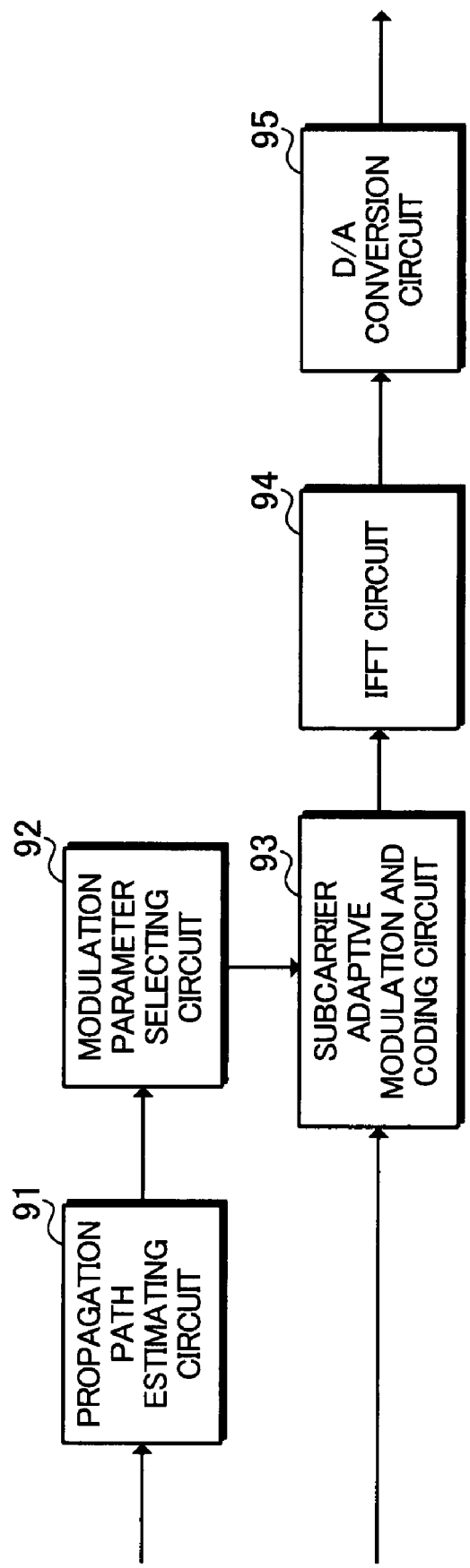
FIG. 24 is a diagram showing an apparatus configuration example in a conventional Orthogonal Frequency Division Multiplexing subcarrier adaptive modulation system.
Figure 25:
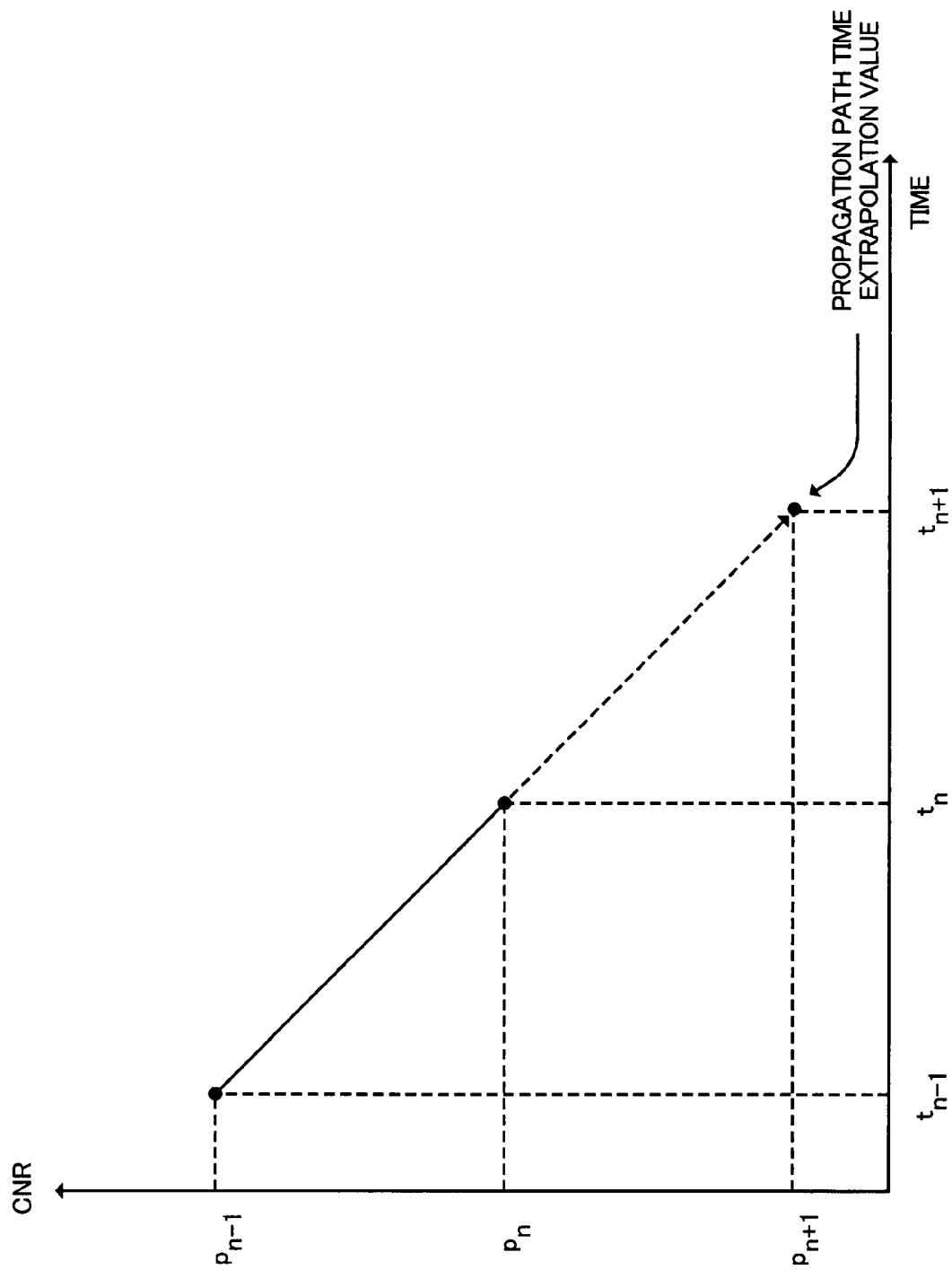
FIG. 25 is a graph showing an example of time extrapolation of the propagation path state by linear approximation.
Figure 26:
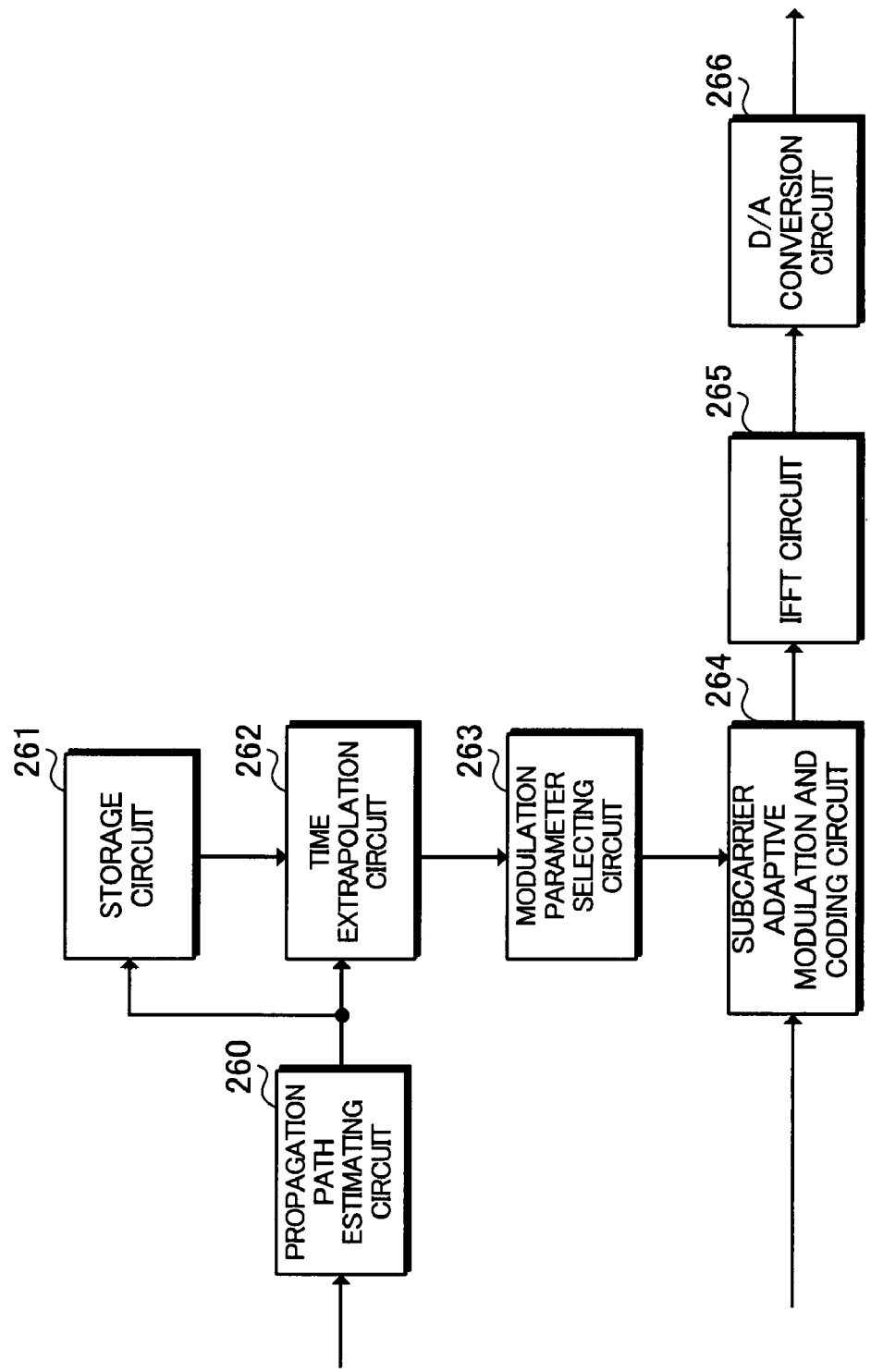
FIG. 26 is a diagram showing an apparatus configuration example in a conventional OFDM subcarrier adaptive modulation system using time extrapolation of the propagation path.
Figure 27:
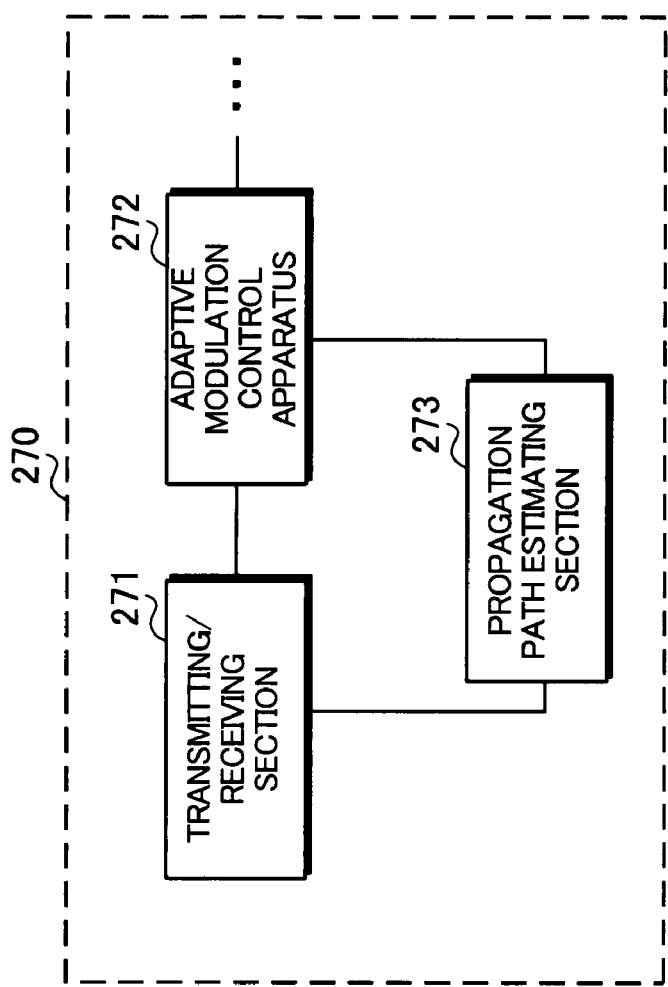
FIG. 27 is a block diagram illustrating a schematic configuration of a wireless communication apparatus to which the present invention is applied.

| | |
|---|---|
| 10 | Propagation path estimating circuit |
| 11 | Frequency axis gradient calculating circuit |
| 12 | Correcting circuit |
| 13 | Modulation parameter selecting circuit |
| 14 | Subcarrier adaptive modulation and coding circuit |
| 15 | IFFT circuit |
| 16 | D/A conversion circuit |
| 70 | Propagation path estimating circuit |
| 71 | Storage circuit |
| 72 | Time axis gradient calculating circuit |
| 73 | Correcting circuit |
| 74 | Modulation parameter selecting circuit |
| 75 | Subcarrier adaptive modulation and coding circuit |
| 76 | IFFT circuit |
| 77 | D/A conversion circuit |
| 80 | Propagation path estimating circuit |
| 81 | Storage circuit |
| 82 | Time axis gradient calculating circuit |
| 83 | Frequency axis gradient calculating circuit |
| 84 | Correcting circuit |
| 85 | Modulation parameter selecting circuit |
| 86 | Subcarrier adaptive modulation and coding circuit |
| 87 | IFFT circuit |
| 88 | D/A conversion circuit |
| 100 | Propagation path estimating circuit |
| 101 | Frequency axis gradient calculating circuit |
| 102 | Storage circuit |
| 103 | Time extrapolation circuit |
| 104 | Correcting circuit |
| 105 | Modulation parameter selecting circuit |
| 106 | Subcarrier adaptive modulation and coding circuit |
| 107 | IFFT circuit |
| 108 | D/A conversion circuit |
| 110, 300, 700, 800 | Modulation parameter determining section |
| 120, 130, 140, 150 | Doppler frequency estimating circuit |
| 270 | Radio communication apparatus |
| 271 | Transmitting/receiving section |
| 272 | Adaptive modulation control apparatus |
| 273 | Propagation path estimating section |

The invention claimed is:

1. An adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, comprising:

frequency axis gradient calculating circuitry configured or programmed to receive propagation path estimation information indicative of an estimation result of a propagation path state, and to calculate a gradient of a function of frequency corresponding to each frequency when the estimation result of the propagation path state is set to be the function of frequency; and a modulation parameter determining section that determines a modulation parameter in said each frequency based on the calculated gradient of the function of frequency in said each frequency.

2. The adaptive modulation control apparatus according to claim 1, wherein the modulation parameter determining section comprises a correcting section that makes a correction to change an upper limit or a lower limit of a numerical range of the propagation path state in one-to-one correspondence with each of the modulation parameters based on the calculated gradient of the function of frequency, and a modulation parameter selecting section that selects a modulation parameter corresponding to the corrected numerical range of the propagation path state including the propagation path estimation information.

3. The adaptive modulation control apparatus according to claim 2, wherein the correcting section does not make a correction to change the upper limit or the lower limit of the numerical range of the propagation path state when the calculated gradient of the function of frequency is zero, while making a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of frequency is higher.

4. The adaptive modulation control apparatus according to claim 3, wherein the correcting section beforehand determines a maximum value of a correction width of the correction, and when the gradient of the function of frequency is discontinuous at a specific frequency, makes a correction to change at least one of the upper limit and the lower limit of the numerical range so that the correction width of the correction is the maximum value.

5. The adaptive modulation control apparatus according to claim 3, wherein when the gradient of the function of frequency is discontinuous at a specific frequency, the correcting section makes a correction to change the upper limit of the numerical range of the propagation path state corresponding to modulation parameters used in the case of poor propagation path state, so that the numerical range of the propagation path state corresponding to the modulation parameters used in the case of poor propagation path state is across all the numerical range of the propagation path state.

6. The adaptive modulation control apparatus according to claim 2, wherein the correcting section determines a correction width based on a distribution of a variation speed of the propagation path state corresponding to the calculated gradient of the function of frequency, and makes a correction to change at least one of the upper limit and the lower limit of the numerical range.

7. The adaptive modulation control apparatus according to claim 6, wherein the correcting section calculates an average value of the distribution of the variation speed of the propagation path state corresponding to the calculated gradient of the function of frequency for each calculated gradient of the function of frequency, and sets the correction width at the average value.

8. The adaptive modulation control apparatus according to claim 6, wherein the correcting section calculates a median value of the distribution of the variation speed of the propagation path state corresponding to the calculated gradient of the function of frequency for each calculated gradient of the function of frequency, and sets the correction width at the median value.

9. The adaptive modulation control apparatus according to claim 6, wherein the correcting section calculates a cumulative probability from a maximum value of the variation speed in the direction in which the propagation path state is improved in the distribution of the variation speed of the propagation path state for the calculated gradient of the function of frequency, for each calculated gradient of the function of frequency, and sets the correction width for each gradient of the function of frequency at a value of the variation speed of the propagation path state having the same cumulative probability.

10. The adaptive modulation control apparatus according to claim 2, wherein the frequency axis gradient calculating section beforehand determines a maximum value of a correction width of the correction, and when the gradient of the function of frequency is discontinuous at a specific frequency, outputs a signal to the correcting section to instruct to make a correction to change at least one of the upper limit and the lower limit of the numerical range so that the correction width of the correction is the maximum value.

11. The adaptive modulation control apparatus according to claim 2, wherein when the gradient of the function of frequency is discontinuous at a specific frequency, the frequency axis gradient calculating section outputs a signal to the correcting section to instruct to make a correction to change the upper limit of the numerical range of the propagation path state corresponding to modulation parameters used in the case of poor propagation path state, so that the numerical range of the propagation path state corresponding to the modulation parameters used in the case of poor propagation path state is across all the numerical range of the propagation path state.

12. The adaptive modulation control apparatus according to claim 2, further comprising:
a moving speed estimating section that estimates a moving speed, wherein the correcting section further changes an amount to correct corresponding to the moving speed estimated in the moving speed estimating section.

13. The adaptive modulation control apparatus according to claim 2, further comprising:
a Doppler frequency estimating section that estimates a Doppler frequency, wherein the correcting section further changes an amount to correct corresponding to the Doppler frequency estimated in the Doppler frequency estimating section.

14. The adaptive modulation control apparatus according to claim 2, wherein the correcting section changes an amount to correct corresponding to an interval of communications.

15. The adaptive modulation control apparatus according to claim 1, wherein the modulation parameter determining section comprises a correcting section that makes a correction to change the input propagation path estimation information based on the calculated gradient of the function of frequency, and
a modulation parameter selecting section that selects a modulation parameter corresponding to the corrected propagation path estimation information.

16. The adaptive modulation control apparatus according to claim 1, wherein the modulation parameter determining section comprises a correcting section that outputs a correction signal corresponding to the calculated gradient of the function of frequency, and a modulation parameter selecting section that selects a modulation parameter based on the input propagation path estimation information and the correction signal.

17. The adaptive modulation control apparatus according to claim 1, wherein the frequency axis gradient calculating section calculates the gradient of the function of frequency corresponding to a specific frequency based on a difference between the propagation path estimation information corresponding to a frequency higher than the specific frequency and the propagation path estimation information corresponding to a frequency lower than the specific frequency.

18. The adaptive modulation control apparatus according to claim 1, wherein the frequency axis gradient calculating section calculates the gradient of the function of frequency corresponding to a specific frequency based on a difference between an average value of a plurality of pieces of propagation path estimation information corresponding to a plurality of frequencies higher than the specific frequency and an average value of a plurality of pieces of propagation path estimation information corresponding to a plurality of frequencies lower than the specific frequency.

19. A wireless communication apparatus at least comprising:
a transmitting/receiving section that performs transmission and reception of a radio signal; and
the adaptive modulation control apparatus as described in claim 1,
wherein the transmitting/receiving section receives the propagation path estimation information indicative of an estimation result of a propagation path state from a communicating party.

20. A wireless communication apparatus at least comprising:
a transmitting/receiving section that performs transmission and reception of a radio signal;
a propagation path estimating section that estimates a state of a propagation path based on propagation path estimation information indicative of a result of measurement of the propagation path state received in the transmitting/receiving section from a communicating party; and
the adaptive modulation control apparatus as described in claim 1.

21. An adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, comprising:
a storage section that stores propagation path estimation information indicative of an estimation result of a propagation path state;
a time axis gradient calculating section that calculates a gradient of a function of time corresponding to each time when the estimation result of the propagation path state is set to be the function of time; and a modulation parameter determining section that selects a modulation parameter based on the calculated gradient of the function of time in said each time.

22. The adaptive modulation control apparatus according to claim 21, wherein the modulation parameter determining section comprises a correcting section that makes a correction to change an upper limit or a lower limit of a numerical range of the propagation path state in one-to-one correspondence with each of the modulation parameters based on the calculated gradient of the function of time, and a modulation parameter selecting section that selects a modulation parameter corresponding to the corrected numerical range of the propagation path state including the propagation path estimation information.

23. The adaptive modulation control apparatus according to claim 21, wherein the modulation parameter determining section comprises a correcting section that makes a correction to change the input propagation path estimation information based on the calculated gradient of the function of time, and a modulation parameter selecting section that selects a modulation parameter corresponding to the corrected propagation path estimation information.

24. The adaptive modulation control apparatus according to claim 21, wherein the modulation parameter determining section comprises a correcting section that outputs a correction signal corresponding to the calculated gradient of the function of time, and a modulation parameter selecting section that selects a modulation parameter based on the input propagation path estimation information and the correction signal.

25. The adaptive modulation control apparatus according to claim 21, wherein the time axis gradient calculating section calculates the gradient of the function of time corresponding to specific time based on a difference between the propagation path estimation information at the specific time and stored past propagation path estimation information.

26. The adaptive modulation control apparatus according to claim 22, wherein the correcting section does not make a correction to change the upper limit or the lower limit of the numerical range of the propagation path state when the calculated gradient of the function of time is zero, and when the calculated gradient of the function of time is negative, makes a correction to change at least one of the upper limit and the lower limit of the numerical range so as to shift the numerical range of the propagation path state in one-to-one correspondence with each of the modulation parameters in the direction of a better propagation path state as an absolute value of the gradient is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the gradient is higher.

27. An adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, comprising:

a storage section that stores propagation path estimation information indicative of an estimation result of a propagation path state;

a frequency axis gradient calculating section that calculates a gradient of a function of frequency corresponding to each frequency when the estimation result of the propagation path state is set to be the function of frequency;

a time axis gradient calculating section that calculates a gradient of a function of time corresponding to each time when the estimation result of the propagation path state is set to be the function of time; and a modulation parameter determining section that determines a modulation parameter in said each frequency based on the calculated gradient of the function of frequency in said each frequency and the calculated gradient of the function of time.

28. The adaptive modulation control apparatus according to claim 27, wherein the modulation parameter determining section comprises a correcting section that makes a correction to change an upper limit or a lower limit of a numerical range of the propagation path state in one-to-one correspondence with each of the modulation parameters based on the calculated gradient of the function of frequency and the calculated gradient of the function of time, and a modulation parameter selecting section that selects a modulation parameter corresponding to the corrected numerical range of the propagation path state including the propagation path estimation information.

29. The adaptive modulation control apparatus according to claim 27, wherein the modulation parameter determining section comprises a correcting section that makes a correction to change the input propagation path estimation information based on the calculated gradient of the function of frequency and the calculated gradient of the function of time, and a modulation parameter selecting section that selects a modulation parameter corresponding to the corrected propagation path estimation information.

30. The adaptive modulation control apparatus according to claim 27, wherein the modulation parameter determining section comprises a correcting section that outputs a correction signal corresponding to the calculated gradient of the function of frequency and the calculated gradient of the function of time, and a modulation parameter selecting section that selects a modulation parameter based on the input propagation path estimation information and the correction signal.

31. The adaptive modulation control apparatus according to claim 28, wherein the correcting section does not make a correction to change the upper limit or the lower limit of the numerical range of the propagation path state when the calculated gradient of the function of frequency is zero and the calculated gradient of the function of time is zero, and when the calculated gradient of the function of time is negative, makes a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of time is higher and an absolute value of the calculated gradient of the function of frequency is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the calculated gradient of the function of frequency is lower.

32. The adaptive modulation control apparatus according to claim 28, wherein the correcting section does not make a correction to change the upper limit or the lower limit of the numerical range of the propagation path state when the calculated gradient of the function of frequency is zero and the calculated gradient of the function of time is zero, and when the calculated gradient of the function of time is negative, makes a correction to change at least one of the upper limit and the lower limit of the numerical range so as to shift the numerical range of the propagation path state in one-to-one correspondence with each of the modulation parameters in the direction of a better propagation path state as an absolute value of the calculated gradient of the function of time is higher and an absolute value of the calculated gradient of the function of frequency is higher, while when the calculated gradient of the function of time is positive, making a correction to change at least one of the upper limit and the lower limit of the numerical range so as to shift the numerical range of the propagation path state in one-to-one correspondence with each of the modulation parameters in the direction of a poorer propagation path state as the absolute value of the calculated gradient of the function of time is higher and the absolute value of the calculated gradient of the function of frequency is higher.

33. An adaptive modulation control apparatus that adaptively selects a modulation parameter from among a plurality of modulation parameters determined based on a plurality of modulation schemes, coding rates in error correction, or combinations thereof, corresponding to an estimation result of a propagation path state, comprising:
a storage section that stores propagation path estimation information indicative of an estimation result of a propagation path state;
a frequency axis gradient calculating section that calculates a gradient of a function of frequency corresponding to each frequency when the estimation result of the propagation path state is set to be the function of frequency;
a time extrapolation section that calculates a propagation path time extrapolation value that is a prediction value of the propagation path state at next communication time, based on the propagation path estimation information and one or a plurality of pieces of past propagation path estimation information stored in the storage section; and
a modulation parameter determining section that determines a modulation parameter in said each frequency based on the calculated gradient of the function of frequency in said each frequency and the propagation path time extrapolation value.

34. The adaptive modulation control apparatus according to claim 33, wherein the modulation parameter determining section comprises a correcting section that makes a correction to change an upper limit or a lower limit of a numerical range of the propagation path state in one-to-one correspondence with each of the modulation parameters based on the calculated gradient of the function of frequency, and a modulation parameter selecting section that selects a modulation parameter corresponding to the corrected numerical range of the propagation path state including the propagation path time extrapolation value.

35. The adaptive modulation control apparatus according to claim 33, wherein the modulation parameter determining section comprises a correcting section that makes a correction to change the propagation path time extrapolation value based on the calculated gradient of the function of frequency, and a modulation parameter selecting section that selects a modulation parameter corresponding to the corrected propagation path time extrapolation value.

36. The adaptive modulation control apparatus according to claim 33, wherein the modulation parameter determining section comprises a correcting section that outputs a correction signal corresponding to the calculated gradient of the function of frequency, and a modulation parameter selecting section that selects a modulation parameter based on the propagation path time extrapolation value and the correction signal.

37. The adaptive modulation control apparatus according to claim 34, wherein the correcting section determines a correction width based on a distribution of a difference value between the propagation path time extrapolation value corresponding to the calculated gradient of the function of frequency and a value indicating the propagation path state at the target time of prediction by the extrapolation, and based on the correction width, makes a correction to change at least one of the upper limit and the lower limit of the numerical range.

38. The adaptive modulation control apparatus according to claim 37, wherein the correcting section calculates an average value of the distribution of the difference value between the propagation path time extrapolation value corresponding to the calculated gradient of the function of frequency and the value indicating the propagation path state at the target time of prediction by the extrapolation, for each calculated gradient of the function of frequency, and sets the correction width at the average value.

39. The adaptive modulation control apparatus according to claim 37, wherein the correcting section calculates a median value of the distribution of the difference value between the propagation path time extrapolation value corresponding to the calculated gradient of the function of frequency and the value indicating the propagation path state at the target time of prediction by the extrapolation, for each calculated gradient of the function of frequency, and sets the correction width at the median value.

40. The adaptive modulation control apparatus according to claim 37, wherein the correcting section calculates a cumulative probability from a maximum value of values such that the value indicating the propagation path state at the target time of prediction by the extrapolation is better than the propagation path time extrapolation value in the distribution of the difference value between the propagation path time extrapolation value corresponding to the calculated gradient of the function of frequency and the value indicating the propagation path state at the target time of prediction by the extrapolation, for each calculated gradient of the function of frequency, and sets the correction width for each gradient of the function of frequency at the difference value having the same cumulative value.

* * * * *